Figure 6:
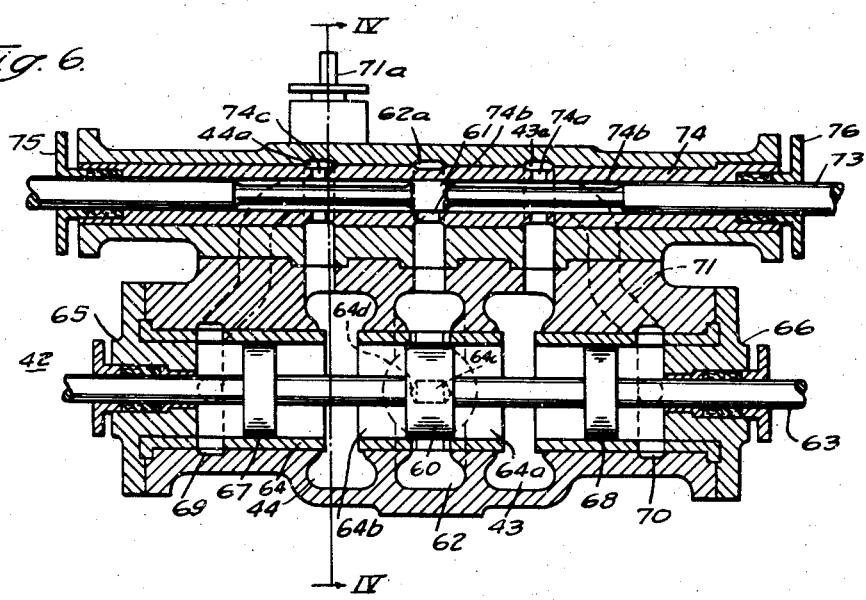

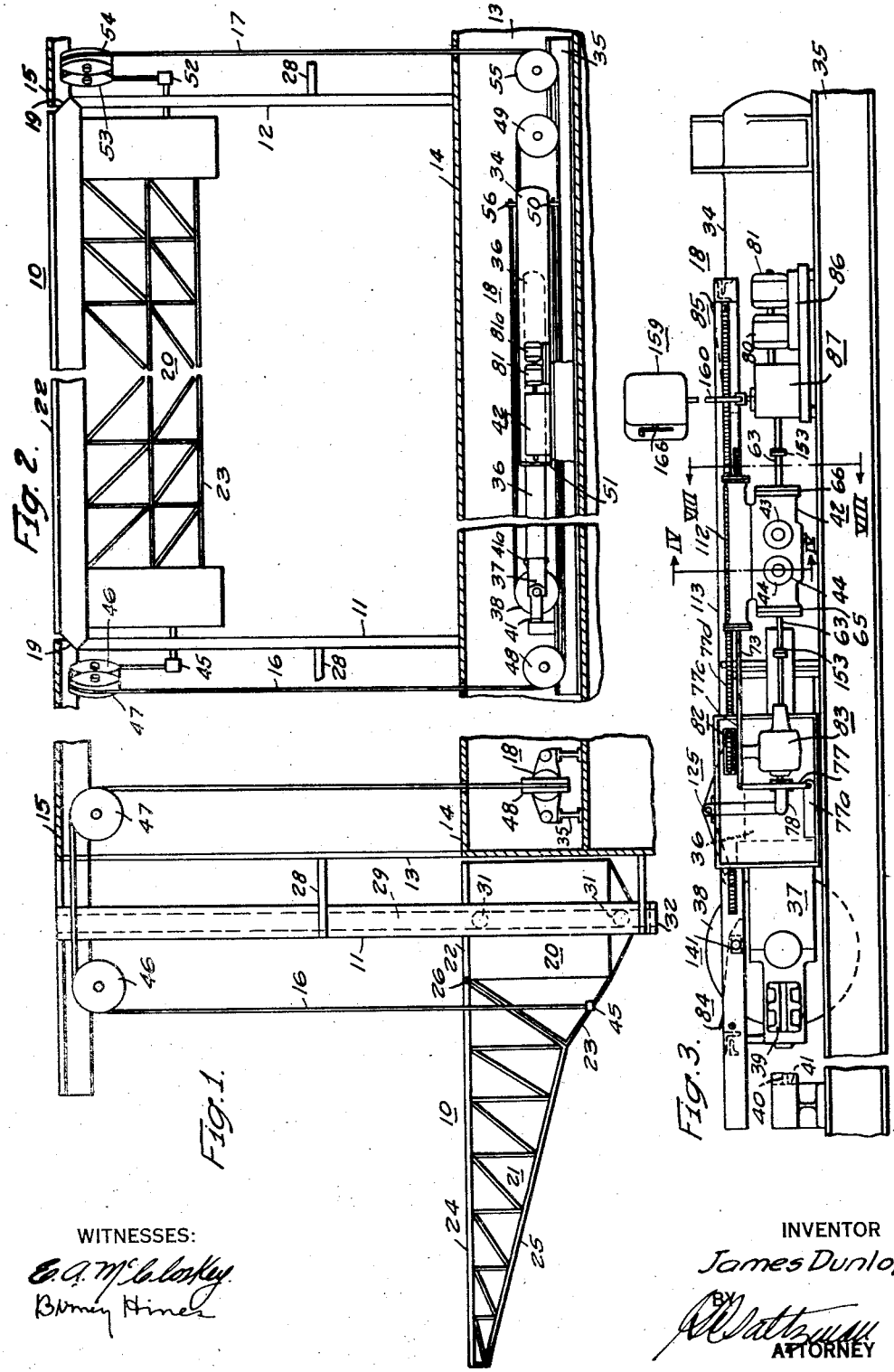

Oct. 15, 1946.  J. DUNLOP  2,409,198
ELEVATOR CONTROL SYSTEM
Filed Dec. 28, 1943  9 Sheets-Sheet 2
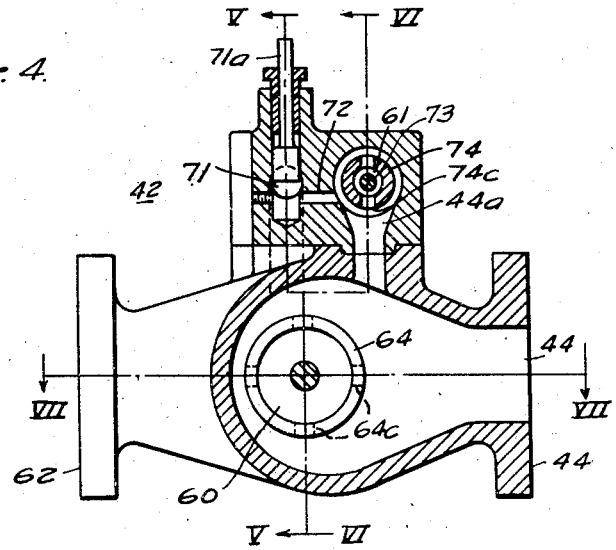
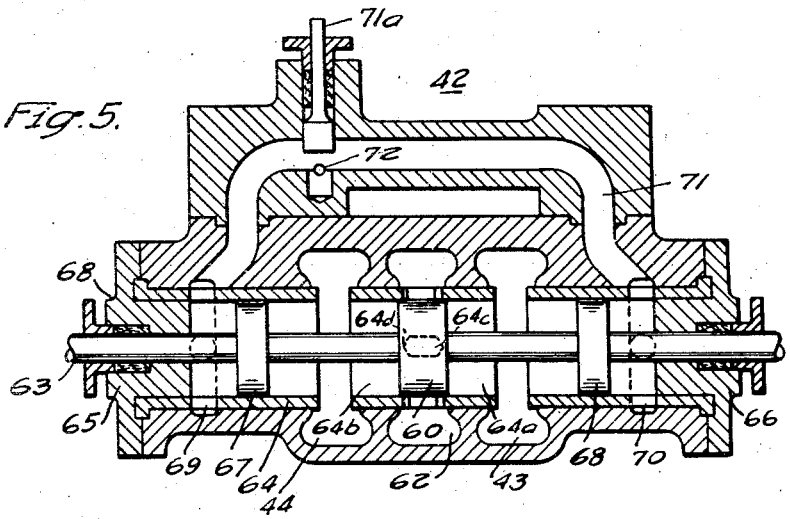
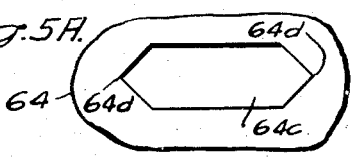
WITNESSES:
INVENTOR
James Dunlop.
BY
ATTORNEY Oct. 15, 1946.   J. DUNLOP   2,409,198

ELEVATOR CONTROL SYSTEM

Filed Dec. 28, 1943   9 Sheets-Sheet 3

WITNESSES:

INVENTOR
James Dunlop.
ATTORNEY

Oct. 15, 1946.   J. DUNLOP   2,409,198
ELEVATOR CONTROL SYSTEM
Filed Dec. 28, 1943   9 Sheets-Sheet 4

WITNESSES:
E. A. McCloskey
Birney Hines

INVENTOR
James Dunlop.
BY
ATTORNEY

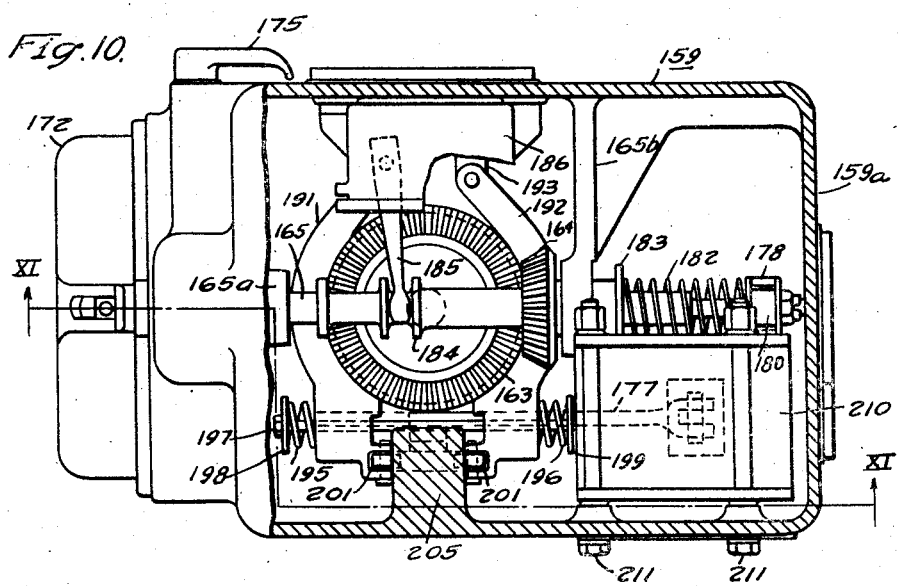

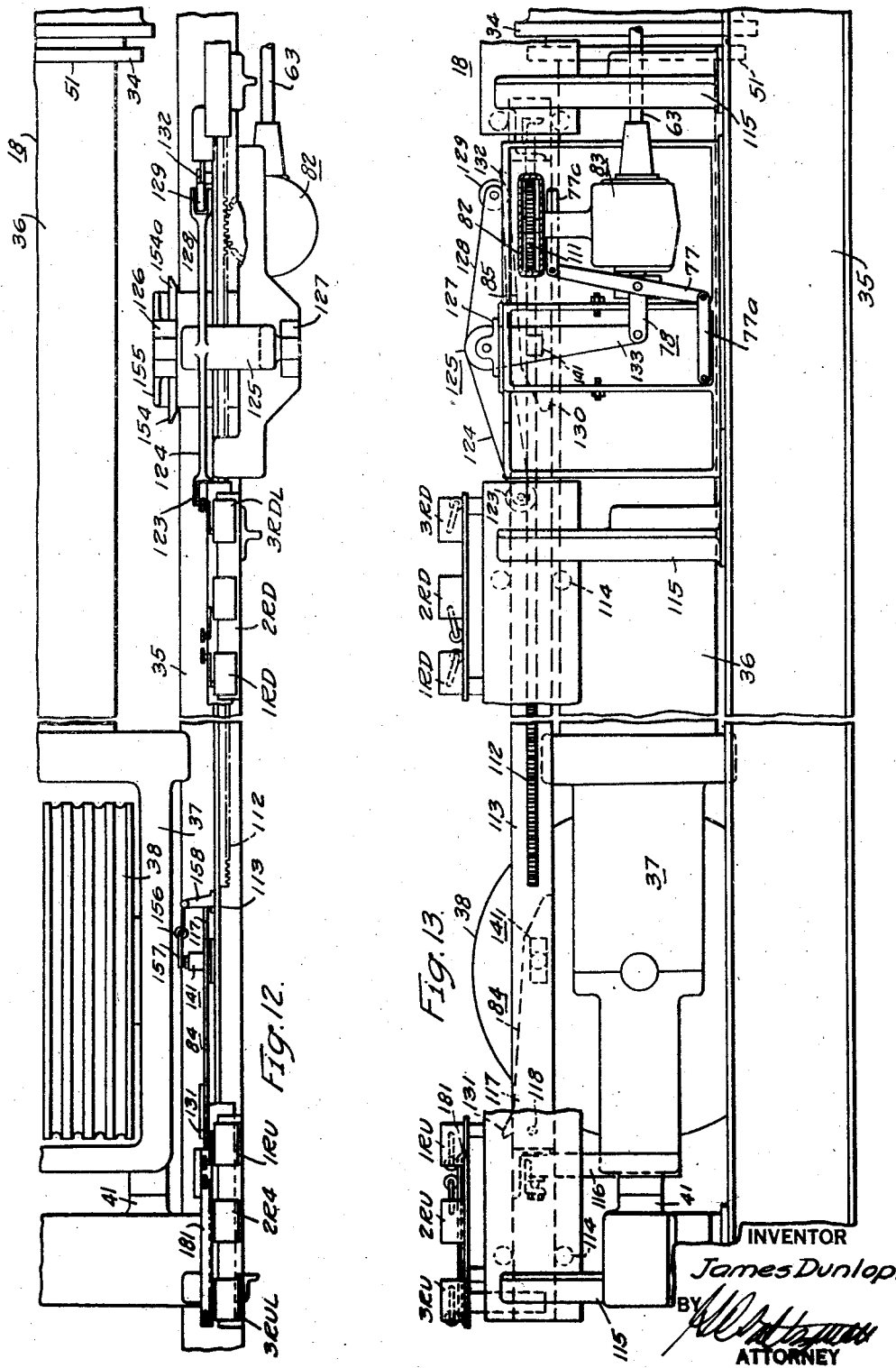

Oct. 15, 1946.   J. DUNLOP   2,409,198
ELEVATOR CONTROL SYSTEM
Filed Dec. 28, 1943   9 Sheets-Sheet 7
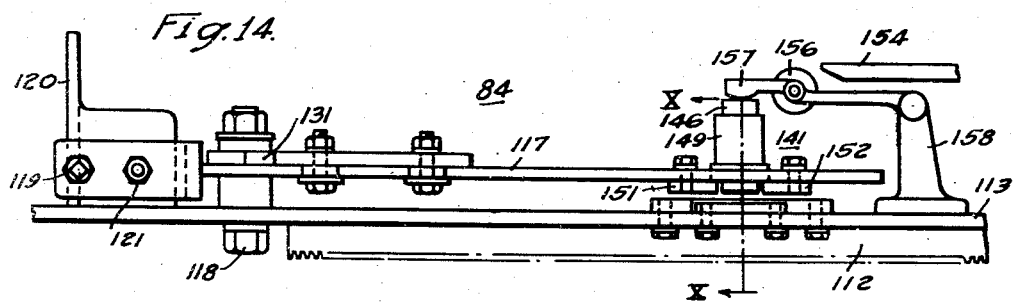
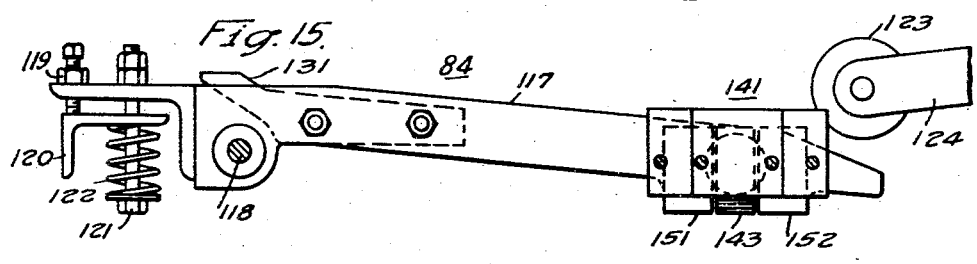
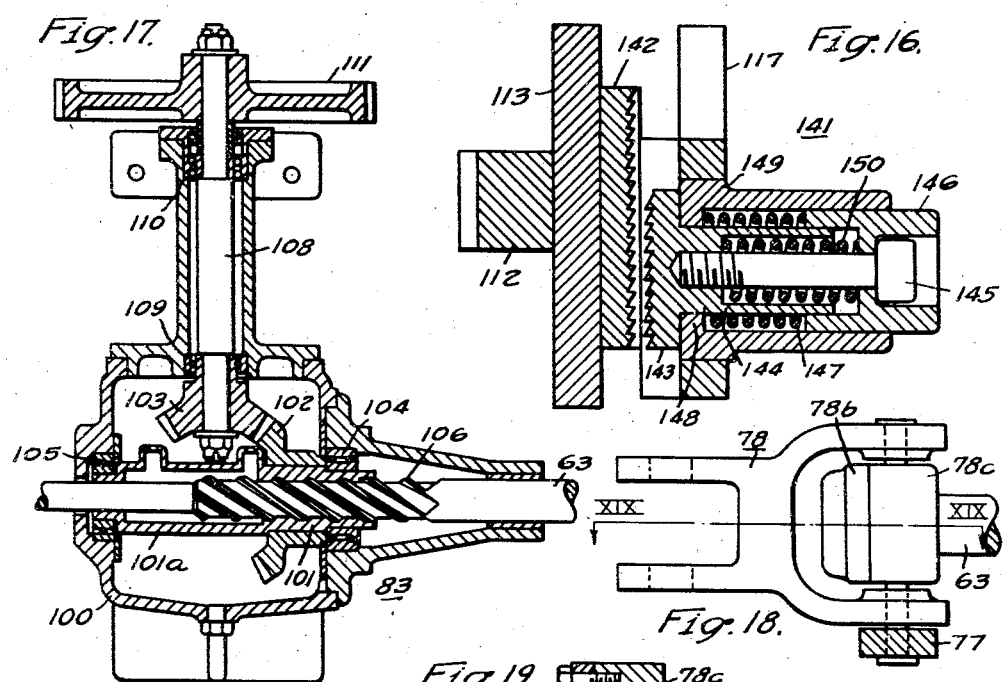
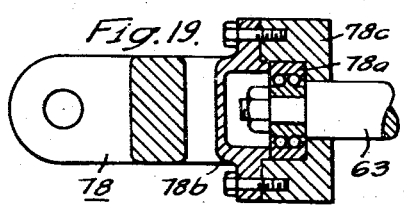
INVENTOR
James Dunlop.

Oct. 15, 1946.    J. DUNLOP    2,409,198
ELEVATOR CONTROL SYSTEM
Filed Dec. 28, 1943    9 Sheets-Sheet 8
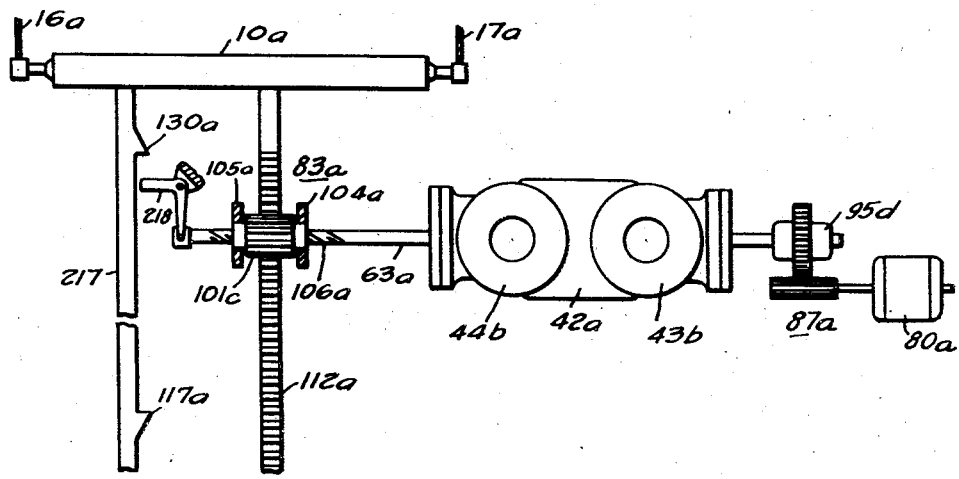
Fig. 22.
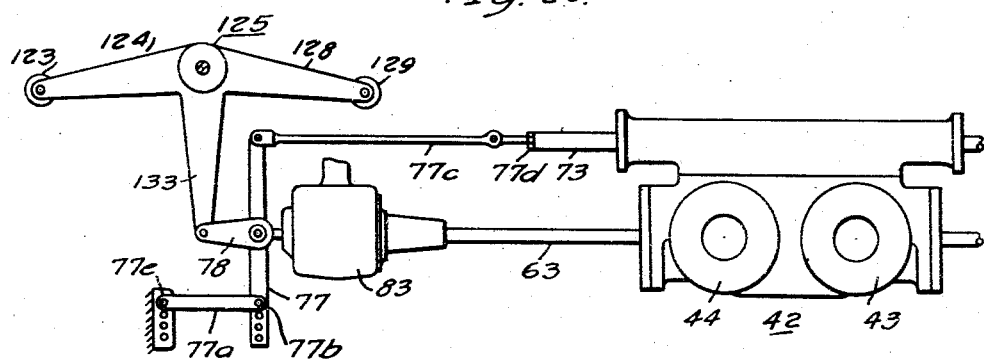
Fig. 20.
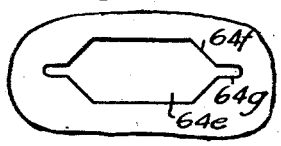
Fig. 23.
WITNESSES:
E. A. McCloskey.
Bomey Himer
INVENTOR
James Dunlop.
BY
ATTORNEY

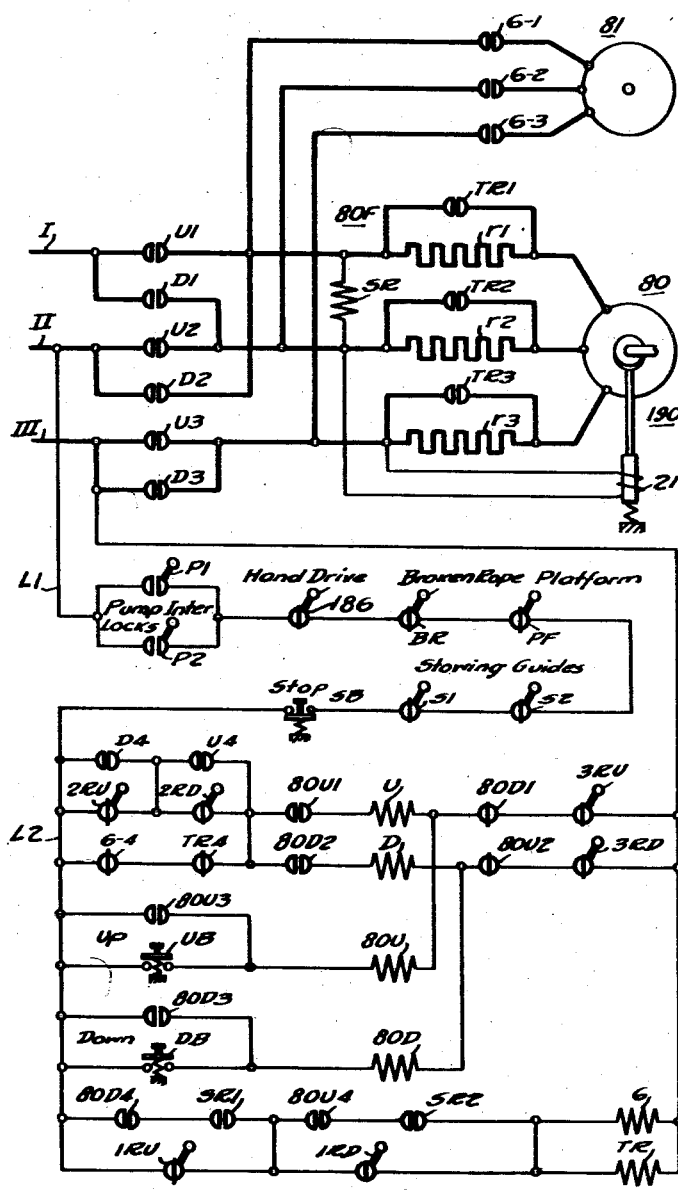

Patented Oct. 15, 1946

2,409,198

UNITED STATES PATENT OFFICE 2,409,198

ELEVATOR CONTROL SYSTEM

James Dunlop, Ridgewood, N. J., assignor, by mesne assignments, to Westinghouse Electric Corporation, East Pittsburgh, Pa., a corporation of Pennsylvania Application December 28, 1943, Serial No. 515,992

39 Claims. (Cl. 121—41)

My invention relates to elevator control systems, and more particularly to control systems for elevators in which hydraulic engines are used for raising and lowering purposes.

One object of my invention is to provide for so controlling the valve of a hydraulic engine used for operating an elevator as to cause the elevator to accelerate to a desired speed and then maintain that speed until it nears its stopping point.

A further object of the invention is to provide a hydraulic engine for operating any suitable apparatus wherein movement of the plunger due to admission and exhaust of motive liquid is controlled by a valve positioned by a differential responsive to speed of a motor and to speed of the plunger.

A further object of the invention is to provide a hydraulic engine for operating any suitable apparatus by movement of a plunger in consequence of admission and exhaust of motive liquid controlled by a valve positioned in response to speed of a motor and to speed of the plunger as well as to the position of the latter.

Another object is to provide a valve control for a hydraulic engine used in connection with an elevator in which the valve will be operated by a motive means running at a predetermined speed and be controlled by a differential means responsive to the movement of the elevator and to rotation of the valve by its motive means for securing a smooth, constant predetermined movement of the elevator.

Another object is to provide means operated by a hydraulic engine for positively moving its valve to its "stop" position as its plunger approaches the end of its stroke regardless of the operation of the motive means for moving the valve.

Another object is to provide a large valve and a small valve, and means for moving the small valve at a speed relative to the speed of the large valve during a stopping operation which will secure a smooth accurate stop.

Another object is to provide a means for balancing the operation of a large valve and a small valve in a hydraulic engine with means responsive to the operation of the engine plunger for overcoming the valve balancing means as the plunger approaches closely the end of its stroke.

A further object is to provide a valve operating means for a hydraulic engine with a cam means responsive to the movement of the hydraulic plunger for moving the valve to its stop position when the plunger approaches closely the end of its stroke and to provide means for adjusting the position of the cam in relation to the extent of opening of the valve means so that its lift surface may be used substantially to its full extent to move the valve means in a closing direction.

A still further object is to provide a valve operating mechanism for hydraulic engines used for hoisting extremely heavy bodies which shall give smooth and rapid acceleration in starting, a constant speed of movement of the body after acceleration is completed, and a smooth deceleration at the end of the stroke of the engine plunger, with a positive stop as the plunger reaches the end of its stroke.

It is also an object of my invention to provide a valve control system for hydraulic engines used in hoisting large bodies which shall be simple and inexpensive to construct, install, operate and maintain in operation.

Figure 7:
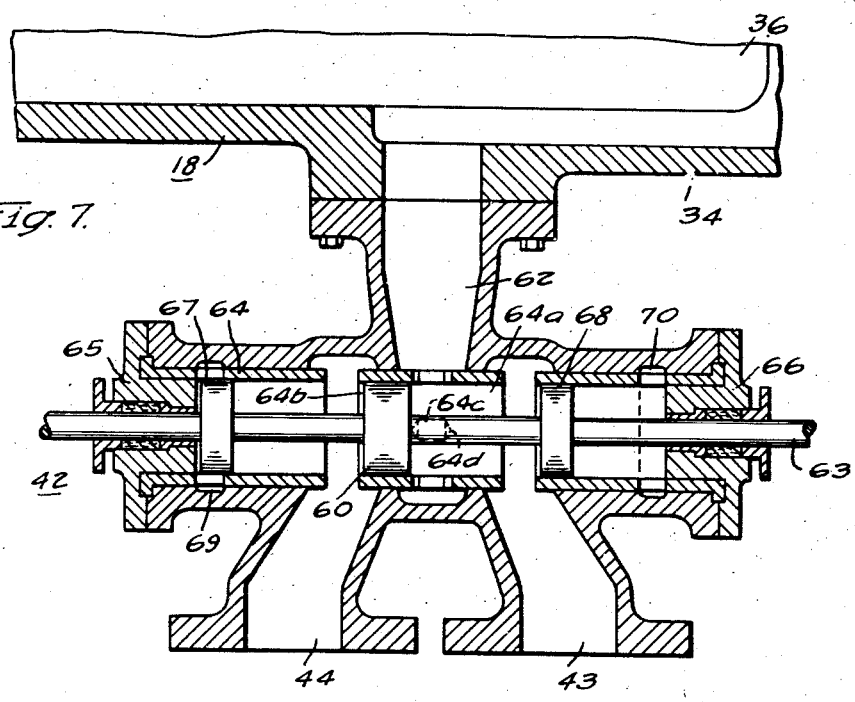
Figure 8:
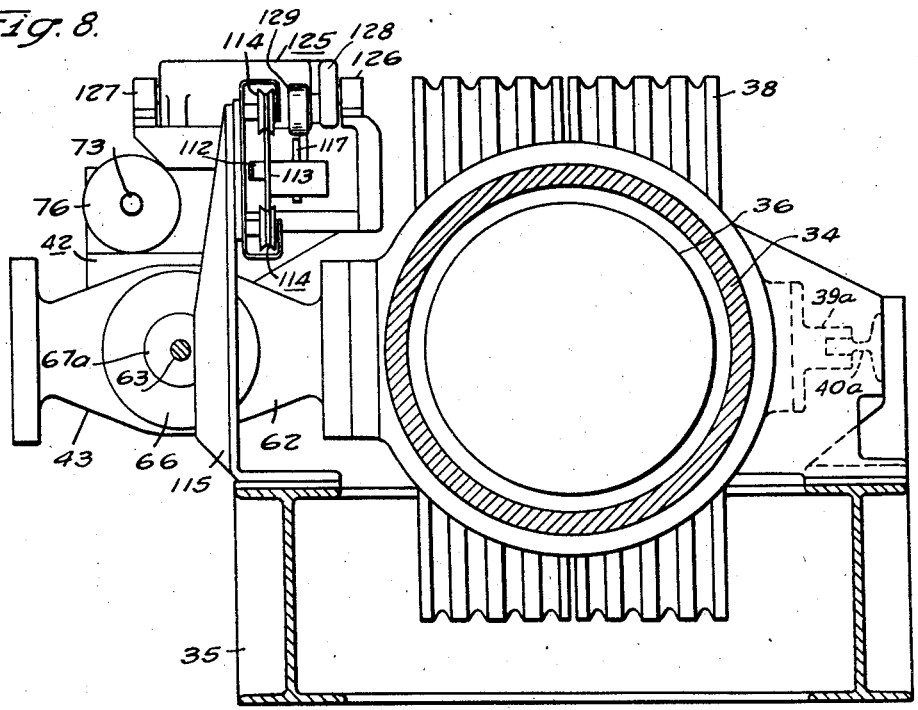
Figure 9:
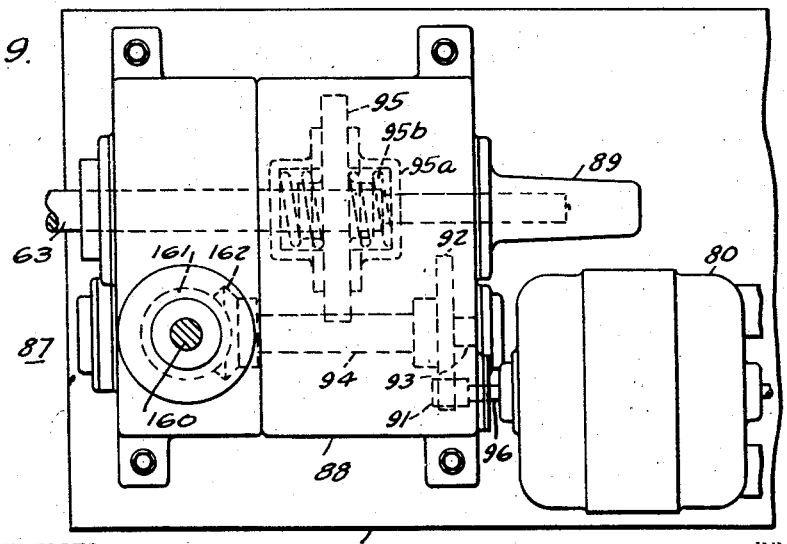

For a better understanding of the invention, reference may be had to the accompanying drawings in which:

Figure 1 is a diagrammatic representation in end elevation of a deck-edge elevator on the side of a ship provided with my improved hoisting apparatus, Fig. 2 is a diagrammatic representation, in side elevation, of the elevator illustrated in Fig. 1 as seen from the inside of the ship and looking outboard and with the elevator platform at the top deck instead of at the main deck, Fig. 3 is an enlarged view, in side elevation, of the engine for operating the elevator illustrated in Figs. 1 and 2 with my improved engine valve and apparatus for operating it, Fig. 4 is a view of the engine valve taken on the line IV—IV of Fig. 3 showing the engine valve in cross-section, Fig. 5 is a view taken on the line V—V of Fig. 4, showing the main valve on a by-pass for the oil back of the balancing pistons, Fig. 5A is an enlarged plan view of one of the ports shown in Figs. 4 and 5, Fig. 6 is a sectional view taken on the line VI—VI of Fig. 4 to show the interior arrangement of the valves, Fig. 7 is a sectional view through the large valve casing taken on the line VII—VII of Fig. 4, Fig. 8 is a view taken on the line VIII—VIII of Fig. 3, giving an end view of the valve casing and its location on the engine, Fig. 9 is a top plan view of the gear reducing mechanism associated with the engine valve, Fig. 10 is an enlarged top view of the hand control station for the engine valve, with the top of its casing removed to show the interior parts in full lines, Fig. 11 is a view, in front elevation of the hand control station with the side of its casing removed, Fig. 12 is an enlarged top plan view of a portion of the valve operating mechanism embodying the invention as applied to the engine shown in Fig. 3, Fig. 13 is a view, in side elevation, of the valve operating mechanism illustrated in Fig. 3, Fig. 14 is an enlarged top plan view of a cam mechanism movable by the engine plunger at the end of its stroke for closing its valve, Fig. 15 is a view, in side elevation, of the cam mechanism illustrated in Fig. 14, Fig. 16 is an enlarged cross-section view through the center of a cam locking device on the cam mechanism illustrated in Figs. 14 and 15, Fig. 17 is an enlarged cross-section view through the center of the differential housing illustrated in Fig. 3, Fig. 18 is an enlarged top plan view of the coupling between the T lever and the main valve shaft, Fig. 19 is a view in cross section of the coupling in Fig. 18, Fig. 20 is a view in side elevation of the lever arrangement for closing the engine valve, Fig. 21 is a straight-line diagram of the control circuit for the valve motors, Fig. 21A is a key representation, showing the location of the relays and their contacts in Fig. 20, Fig. 22 is a view in side elevation of a modified form of my invention as applied to an elevator in which parts of the engine control are operated directly by the elevator platform, and Fig. 23 is a modified form of one of the valve ports shown in Figs. 4 and 5.

Although the invention is illustrated in connection with a hydraulic engine for operating the hoisting cables of large deck-edge elevators such as are used on airplane carrier ships, it is to be understood that it may be used in controlling the valves of hydraulic engines for operating elevators of other types or for any other suitable purpose.

Referring more particularly to the drawings, I have illustrated a deck-edge elevator comprising an elevator platform 10 disposed between a pair of guide rails 11 and 12 mounted on the outside of a ship hull 13, in position to be supported by and to be raised and lowered between a main deck 14 and a flight deck 15 by a plurality of hoisting cables 16 and 17 operated by a hoisting engine 18.

The platform 10 comprises a base section 20 and a hinged or outboard section 21, the floors of which normally lie in the same plane and provide a large level area upon which airplanes may be moved and carried from one deck to another. The base section of the platform is constructed with a suitable flooring 22 laid upon a frame 23 made of seamless steel tubing, structural steel sections and steel plate welded together in bridge-like construction to form a relatively light but strong structure. The outboard section of the platform is also constructed with a suitable floor 24 laid upon a frame 25 of seamless steel tubing, structural steel and steel plate welded together in bridge-like construction in the same manner as the base and is mounted upon and connected to the base by a suitable hinged joint 26 so that it may be raised from its normal horizontal position into a vertical position on the base when the ship has to pass through a canal lock or other narrow opening.

The guide rails 11 and 12 are mounted in vertical position and facing each other on the side of the ship hull by means of a plurality of horizontally disposed brackets 28.

The guide rails are provided with vertical slots 29 in their sides facing each other which are disposed to receive a plurality of rollers 31 rotatably mounted on the base section 20 for the purpose of guiding the movement of the elevator platform as it is raised or lowered and for also maintaining the platform in its horizontal position. A block 32 is securely fastened by welding to the lower end of each guide rail to prevent the elevator from dropping on down through the slots in case of failure of the safeties, cables, etc. In normal operation, the platform is suspended entirely by its hoisting cables.

The hoisting engine 18 is operatively connected to the platform to raise and lower the latter. As shown, the hoisting engine 18 is a hydraulic engine comprising a cylinder 34 mounted in a horizontal position on a frame or engine bed 35 and a power plunger 36 disposed in the cylinder. The outer end of the plunger is provided with a power head 37 in which a pair of power sheaves 38 are rotatably mounted. The plunger in the cylinder slides back and forth horizontally and thus moves the power sheaves back and forth with it. Guide rails 40 and 40a are mounted on the sides of the engine frame 35 in position to extend into grooved guide plates 39 and 39a (Figs. 3 and 8) on the sides of the plunger head for supporting the outer end of the plunger in its horizontal movements. Suitable stopping blocks such as 41 and 51 (Fig. 2) are provided for stopping the plunger at the end of its forward stroke and at the end of its rearward stroke.

Suitable stops 19 (Fig. 1) are mounted on the flight deck to stop the platform thereat and by placing the plunger stops 41 and 51 on the hoisting engine at such positions that the engine will continue the hoisting pull on the cables after the platform is stopped by the stops 19 until all of the stretch in the cables is taken up, the platform will be held level with the flight deck when stopped thereat regardless of loading. For more detailed information on the means for holding the platform at the flight deck, reference may be had to my copending application Serial No. 507,122, filed October 21, 1943, in which such means are described and claimed.

The plunger is designed for operation by any suitable hydraulic medium such as oil maintained under pressure by any suitable pumping apparatus (not shown).

A valve block 42 is mounted on the cylinder for controlling the operation of the plunger by opening an oil pressure port 43 from a high pressure tank (not shown) for raising the platform and by opening an oil exhaust port 44 to a low pressure tank (not shown). The low pressure tank and the high pressure tank are not shown because they are old and well known in hydraulic engine systems for providing a closed system having a low pressure side and a high pressure side.

The hoisting cables 16 at the left-hand end of the platform are secured to the base 20 by means of a bracket 45 mounted thereon and pass upwardly and over an idler sheave 46 fastened to the ship structure underneath the overhanging portion of the flight deck, thence rearwardly over a second idler sheave 47 mounted on the ship frame inside the hull, thence downwardly and under a deflector sheave 48 mounted on the engine bed 35, thence around a stationary sheave 49 mounted on the engine bed, thence forward and around one of the power sheaves 38 mounted in the power head 37, and thence to a dead-end hitch 50 mounted on the lower part of the rear end of the engine cylinder 34.

The hoisting cables 17 at the right-hand end of the elevator are secured to the base 20 by a bracket 52 mounted thereon and pass upwardly and over an idler sheave 53 fastened to the ship structure underneath the overhanging portion of the flight deck, thence rearwardly over a second idler sheave 54 mounted on the ship frame inside the hull, thence downward and under a deflector sheave 55 mounted on the engine bed, thence under and over one of the power sheaves 38 mounted in the engine plunger head 37, and thence to a dead-end hitch 56 mounted on the upper part of the rear end of the engine cylinder.

The valve block 42 is provided with a main valve 60 and a leveling or vernier valve 61 (Fig. 6) for controlling the flow of oil into the engine cylinder through the high pressure port 43 and a cylinder port 62 and out of the cylinder through the cylinder port and into the low pressure port 44.

The main valve 60 is preferably cylindrical in form and is operated by a shaft 63 which is slidably and rotatably mounted in a valve chamber 64 by means of a pair of stuffing box glands 65 and 66 which close the outer ends of the valve chamber.

The pressure port 43 is connected with the section 64a of the valve chamber 64. The exhaust port 44 is connected to the section 64b of the valve chamber. The valve chamber is connected at its central section with the cylinder port 62 by a plurality of valve ports 64c.

The valve ports 64c are provided with tapering ends 64d to taper off the volume of the oil when the valve is closing, and to prevent excessive leakage through the port when the valve is closed, as a longer lap is provided than in other types. The form of these valve ports prevents "water hammer" and vibration, often resulting with the use of other ports in systems similar to this. Furthermore the tapered ports will cause the engine to operate more smoothly than with the ports usually used. Tapering of the port ends provides for increase in flow area at an increasing rate in relation to valve travel as the valve uncovers its cylinder port, with the result that the desired acceleration for starting may be had in order that the elevator may be rapidly brought up to the speed determined by that of the motor means. While tapering of the port ends inherently involves a decreasing rate of flow area decrease in relation to valve travel and would unduly string out deceleration due to movement of the valve in response to differential action in consequence of stopping the motor, this disadvantage is not only entirely overcome by the stopping mechanism moving the valve in a closing direction independently of differential action but such independence avoids critical control of the motor for stopping with the result that the elevator may be rapidly retarded as a stop is approached without shock or hammering and with smooth operation. Hence, with both acceleration and deceleration rapidly and smoothly effected, the elevator may move at maximum speed for the maximum portion of the travel distance.

With the valve 60 lapping the ports 64c, oil cannot flow through the latter into or out of the engine cylinder. The valve has sufficient axial length to cover the ports 64c as soon as it approaches closely to its dead-center position so that it will lap such ports while the vernier or leveling valve 61 is still slightly open. If the valve 60 is moved toward the port 44 so as to uncover the ports 64c, then (Fig. 7) oil flows through the high pressure port 43, the valve chamber section 64a, the valve ports 64c and the cylinder port 62 into the engine cylinder; and, if the valve is moved from its dead center position in the other direction toward the port 43, then oil flows out of the engine cylinder through the cylinder port 62, the valve ports 64c, the valve chamber section 64b and the low pressure port 44.

It will also be apparent that with the tapered valve ports, the relative lapping of the valves and the leverage, the opening and closing of the engine ports will be progressive for the purposes indicated.

A pair of balancing pistons 67 and 68 are also mounted on the shaft 63 in the outer portions of the valve chamber and an equalizing passageway 71 (Fig. 5) connects passages 69 and 70 connected with the valve chamber sections back of these pistons. The passageway 71 is also connected by a passageway 72 with the low pressure or exhaust port 44. The equalizing passageway and the balancing pistons provide means for minimizing the oil leakage from the high pressure side of the system. The equalizing passage keeps the same pressure on the two ends of the valve to keep the system in balance statically and permit ready movement of the pistons. Movement of the pistons will cause oil to flow through the equalizing passage; and, if the passage is restricted, a load is placed on the valve drive. This load slows down the valve drive motors (to be described later herein). Therefore, a screw threaded valve 71a is mounted in the equalizing passageway for adjustably restricting the flow of oil through the passageway and thus secure better control of the acceleration and retarding action of the motors.

While the shaft 63 may be operatively connected to the main valve in any suitable manner, preferably, as shown, such shaft carries the main piston valve 60 and the balancing pistons 67 and 68 to constitute a piston valve structure rotatable in the cylindrical valve chamber. Therefore, the term "valve shaft," as used herein, has the significance of a shaft capable of positioning a valve of any suitable type whether the latter is unitary with the shaft or operated by the latter.

The leveling or vernier valve 61 is preferably made as a piston portion on a leveling or vernier valve shaft 73 slidably disposed in a vernier valve chamber 74 in the valve block and disposed parallel to the main valve chamber 64. The ends of the leveling or vernier valve chamber are closed by a pair of stuffing box glands 75 and 76. The high pressure port or space 43 is extended at 43a to communicate with a plurality of ports 74a in the leveling valve chamber 74 and the cylinder port 62 is extended at passage 62a to communicate with a small valve port 74b in the central portion of the leveling valve chamber. The low pressure port or space 44 is extended at 44a to communicate with one or more ports 74c in the leveling valve chamber.

The leveling valve 61 is closed when it is in its central position and covering the port 74b, as shown in Fig. 6, and no oil can then flow through such port into or out of the cylinder. When the leveling valve 61 is moved to the left, it admits oil from the high pressure port 43 through the extension 43a of the latter and the ports 74a and 74b into the cylinder port leading into the engine cylinder. When the valve 61 is moved to the right, it permits oil to flow out of the engine cylinder and the cylinder port and through the ports 74b and 74c and the passage 44a into the low pressure port 44.

The shaft 63 of the main valve is connected to the shaft 73 of the leveling valve by a lever or other mechanism 77 (Figs. 3 and 20) so that movement of the main valve moves the leveling valve. The lower end of the lever 77 is fulcrumed on the engine frame 35 by a link 77a, its central portion is connected to the shaft 63 by a swivel coupling 78 and its upper end is connected to the shaft 73 by a link 77c. An adjustable joint 77d (Figs. 3 and 20) is used to connect the link 77c to the shaft 73 so that the position of the leveling valve relative to the position of the main valve may be readily adjusted.

The link 77a (Fig. 20) is preferably adjustably connected at 77e and 77b to the engine frame 35 and to the lever 77 to vary the lever arms with respect to the valves so that the travel of the leveling valve may be adjusted for a given stroke of the main valve.

The coupling 78 (Figs. 3, 18 and 19) is pivotally connected to the shaft 63 by means of a combined radial and thrust ball bearing 78a (Figs. 18 and 19) held by a cap 78b in a body 78c which is mounted by trunnion pins in the forked right end of the coupling.

The main valve 60 is arranged to lap its ports 64c to a greater extent than the leveling valve 74 covers its ports 74b with the result that the ports 64c are closed with the leveling valve ports 74b partially open. Due to the tapering of the ends of the main valve ports 64c, to the adjustment of the main and vernier valves, and to the shape of the actuating cam (hereinafter described), the main and leveling valves are moved in closing and opening directions to provide a metering or vernier effect, thereby securing a restricted or graduated inflow or outflow of oil with consequent smoothness of action. Further, with the valve piston 60 lapping its cylinder port 64c, the vernier valve partially covers its cylinder port 74b so that high pressure is effective to hold the platform in its "up" position and so that liquid under low pressure acts on the plunger to counteract the effective gravity to a desired extent with the platform in its lowermost position.

The means for operating and controlling the main valve comprises (Fig. 3) a pair of motors 80 and 81 responsive to a push button control system for rotating the valve-positioning shaft 63, a gear mechanism 82 operated by the engine plunger, a differential mechanism 83 responsive to operation of the valve-positioning shaft and the gear mechanism for automatically controlling movement of the valve to secure the desired acceleration and normal running speed of the elevator, and cam mechanisms 84 and 85 for effecting valve-closing movement upon the completion of a plunger stroke, the cam mechanism 84 being moved into operating position by the plunger at the end of its inward stroke, and the cam mechanism 85 being moved into operating position by the plunger at the end of its outward stroke.

The motors 80 and 81 may be reversible constant speed torque motors of any suitable type mounted by a base plate 86 on the engine bed 35 and connected to the main valve shaft 63 by a slidable gear reducing mechanism 87. The motors should be so constructed that they can be stalled and even reversed in motion by a forcible closing movement of the valve during a valve closing action as the plunger reaches the end of either its forward stroke or its rearward stroke. It will be obvious that one motor instead of two motors may be used where desirable.

The gear reducing mechanism 87 (Fig. 9) is provided with a casing 88 in which the right-hand end of the valve shaft 63 is rotatably mounted. Inasmuch as the shaft 63 moves longitudinally, a cap 89 is mounted on one side of the casing to protect the outer end of the shaft when it moves beyond the casing wall. The motors 80 and 81 are coupled on a shaft 90 which extends into the casing 88 and is provided with a pinion 91 disposed to mesh with a gear wheel 92 fixed on a gear shaft 93 rotatably mounted in the casing. A pinion 94 is disposed on the gear shaft in position to mesh with a gear wheel 95 mounted on the valve shaft 63 so that rotation of the motors will effect a corresponding reduced rotation of the valve shaft. The pinion 94 is made much wider than the gear wheel 95 so that the shaft 63 may move axially with the gears still in mesh.

A clutch or power transmitting device 95a (Fig. 9) is disposed between the gear wheel 95 and the shaft 63 and provided with spring connectors 95b to permit a limited resilient axial movement between the gear wheel and the shaft sufficient to absorb shocks between the gear and the shaft and also to take care of the rotational movement of the shaft during the final closing movement of the cam mechanism after the motors are deenergized and a brake 190 is applied. Any suitable clutch or resilient power transmitting device which will permit a limited axial movement of the shaft may be used but I prefer to use the power transmitting device disclosed and claimed in my copending application Serial No. 514,519, filed December 16, 1943.

The shaft 63 extends through the differential mechanism 83. A portion of the shaft 63 in the differential is formed as a screw 106 having a steep pitch to constitute one part of the differential (Fig. 17). The other part of the differential is constituted by a nut member 101 which engages the screw 106 and which is capable only of rotational movement controlled by the engine plunger.

The threads of the screw and of the nut are coarse and have such helical angles that either may drive the other by screw-and-nut action. Hence, if the screw and the nut have differential rotation with the nut restrained against axial movement, the screw-threaded action will give an axial movement to the valve-positioning shaft for moving the valve means in opening and closing directions.

With the nut capable only of rotational movement and the screw arranged both for movement rotationally and translatorily in an axial direction, it will be apparent that these parts are capable of functioning as a differential. The effect of rotary input motion or motions imparted to the screw and/or nut is to give to the screw a translatory output motion provided that the screw and nut rotate differentially, the effect of rotary input motion given to the screw being to move it translatorily to move the valve means in an opening direction and the effect of rotary input motion given to the nut being to move the screw translatorily to move the valve means in a closing direction.

Furthermore, the screw has a thread of such angle that it is not self-locking but is a free-running screw so that it may have translatory input motion imparted to it in response to plunger position, in which event it will have a rotational output motion unless the nut is rotated sufficiently to avoid the latter. Therefore, it is essential that rotational movement of the shaft 63 for this reason shall not be prevented or resisted unduly. Hence, the driving motor has a rotor which is freely rotatable relative to its stator structure so that the rotational effort of the shaft may retard or reverse the rotor. Also, because of such rotational output motion of the shaft 63, the gear 95 is connected thereto by the resilient coupling 95a providing for a limited relative angular movement of the shaft 63 when such gear is held by the brake, such coupling being disclosed and claimed in my aforesaid application, Serial No. 514,519.

From the foregoing, it will be apparent that the screw may have applied thereto either rotational or translatory input motion, that the nut has only rotary input motion imparted thereto, and that in all cases output motion of the differential is delivered by the screw, such output motion either being translatory motion of the screw or rotational movement thereof depending, respectively, on rotary input motion and translatory input motion being imparted thereto.

Inasmuch as the pinion 94 is much wider than the gear wheel 95 and has a width equal to the length of the screw 106 of the differential, the shaft 63 and the gear wheel 95 are permitted to move axially a distance equal to the width of the gear pinion 94, which distance should be equal to the distance the shaft must be moved to open and close the valve ports.

The differential mechanism 83 is disposed in a gear casing 100 (Fig. 17) mounted on the engine. The nut 101 has an extended hollow shaft or sleeve portion 101a and is rotatably mounted in the casing by a pair of ball bearings 104 and 105 which prevent axial movement thereof but render it easily rotatable. The means by which the plunger rotates the nut comprises a bevel gear 102 fixed on the nut, a bevel gear 103 disposed in mesh with the bevel gear 102 and fixed on the lower end of a vertical shaft 108 rotatably mounted in the upper part of the casing by suitable ball bearings 109 and 110, and a gear wheel 111 fixed on the upper end of the shaft in position to be operated by the gear mechanism 82 operated by the plunger.

The gear mechanism 82 includes a gear wheel 111 which is fixed on the upper end of the shaft 108 in position to be engaged by and operated by a gear rack 112 (Figs. 12 and 13). The gear rack 112 is fixed on a rack bar 113 slidably disposed between and supported by a plurality of rollers 114 in a plurality of brackets 115 mounted on the engine bed. An arm 116 is mounted on the plunger head with its upper end attached to the rack rail so that the plunger will move the rack rail along with it as it moves back and forth and thereby cause rotation of the gear wheel 111, shaft 108, gear wheel 103 and gear wheel 102.

Inasmuch as the gear wheel 102 is fixed on the nut 101 which is restrained from axial movement and which is disposed on the screw 106 on the valve shaft 63, rotation of the gear wheel 102 will cause either similar rotation of the valve shaft 63 or axial movement thereof, depending upon whether or not the valve shaft is being rotated at the time and its speed of rotation. When the shaft 63 is rotated by the motors 80 and 81 it will move axially if the bevel gear wheel 102 is stationary.

With this construction, when the plunger and the nut 101 are at rest and the motors 80 and 81 are operated to open the main valve to its "up" position or to its "down" position, they rotate the valve shaft 63 in the nut 101. This rotation of the shaft and its screw 106 causes axial movement of the shaft and the valve as long as the nut 101 remains stationary; but, as the plunger starts to move, it rotates the nut 101 on the screw threaded portion 106 of the shaft 63 and thereby slows down the axial movement of the shaft.

As the plunger speeds up, the rotational speeds of the nut 101 and the shaft 63 approach each other, and, at the desired speed of the plunger, the speed of the nut and the speed of the shaft are the same, so that the axial movement of the shaft ceases and the valve remains stationary in the position to which it has been moved. In other words, the motor tends to open the valve while the plunger motion tends to close the valve. Consequently, the valve will seek a position which will maintain the plunger speed in a direct ratio with the motor speed while the elevator is running between terminals. Further, as the valve flow area increases until the platform speed is in predetermined relation to the motor speed, it will be apparent that load variations, including that due to changes in motive oil viscosity, are cared for by variation in flow area.

The cam mechanism 84 at the left-hand end of the plunger has a rear cam 117 (Figs. 12, 13, 14, 15) which is pivotally mounted at its left-hand end by pin 118 on the rear face on the left-hand end of the rack rail (Figs. 3, 12, 13), so that it will move with the rack rail. An adjustable stop bolt 119 in the left-hand end of the cam is disposed to engage a bracket 120 on the rack rail 113 to limit the up movement of the free end of the cam. A bolt 121 is mounted on the left-hand end of the cam and passes through a bracket 120 on the rack rail for holding a spring 122 under compression to bias the free end of the cam upwardly to the limit set by the stop bolt 119. The upper face of the cam 117 is disposed to engage and raise a roller 123 on the left arm 124 of a T-lever 125 when the rack rail is moved by the engine plunger to the right as it approaches the end of its inward stroke.

The T-lever is rotatably mounted in a pair of bearings 126 and 127 on the engine frame and is also provided with a right-hand arm 128 carrying a roller 129 disposed to be engaged by a front cam 130 in the cam mechanism 85 at the rear end of the plunger. The cam 130 is mounted on the right-hand end of the rack rail in the same manner as the left-end cam 117 but in reverse relation with respect to the latter.

The shape of the upper face of the cam 117 is such that it will gradually raise the roller 123 as the plunger approaches the end of its rear stroke and thereby rock the T-lever in clockwise direction. The shape of the cam 130 is such that it will gradually raise the roller 129 when the engine plunger approaches the end of its forward stroke and thereby rock the T-lever in counterclockwise direction. The shapes of the cams will usually be slightly different in order to secure the most desirable slowdown effects as the plunger approaches the end of its outward stroke and as it approaches the end of its inward stroke. Cam tips 131 and 132 are mounted on the cams 117 and 130 for ensuring the predetermined closing movement of the valve desired at the end of either plunger stroke. These tips are preferably removable so that they may be replaced at any time when worn or when it is desired to change the contour of the cams at their valve closing points. As the cams are biased upwardly about the pivots 118 by the springs 122, they are positioned to be acted upon by the follower mechanism, each cam thereby being positioned to suit the extent of valve opening. As the cams are then locked in adjusted position, it will be apparent that the surface of each cam will be effective to its full extent regardless of variation in lift occasioned by the extent of valve opening variation with the result that the closing action begins approximately at the same point in the elevator travel under different conditions.

The T-lever 125 is provided with a depending arm 133, the lower end of which is pivotally connected to the swivel coupling 78 on the left end of the valve shaft 63.

Inasmuch as the swivel coupling 78 connects the T-arm 133, the lever 77 and the shaft 63, any movement of the T-lever by the cams will effect axial movement of the shaft 63 and the shaft 73. Conversely, any axial movement of the shaft 63 will move the T-lever and the shaft 73.

By reason of the leverage exerted by the lever 77, the shape of the valve-closing cams, the larger lap of the main valve as compared to the vernier valve as well as the lapping relation of the valves, the off position of the valves at the end of up travel will not be the same as their off position at the end of down travel. The shape of the up cam 130 should be such as to operate the T-lever to so move the valves that, while the main valve is closed, the leveling or vernier valve will leave a little of the leveling port exposed when the plunger is forced against its up stopping blocks 41 and thereby keep the plunger forced against them with full pressure on up motion due to the leakage through the exposed portion of the up leveling valve permitting pressure from the pressure side of the system to build up.

On the other hand, on down motion the weight of the platform is kept from causing too rapid speed of the plunger for the down direction by balancing part of the weight by the pressure in the low pressure side of the system, as the cylinder is exhausted to the low pressure tank. At the lower level, the cam closes the ports in the main valve and in the leveling valve until the reduced rate of the exhausting oil slows down the platform. Finally the plunger strikes its rear stop, but the shape of the down cam 117 is such that it does not cause the leveling valve to fully close the leveling valve port but leaves a little of it exposed so that the remaining pressure in the cylinder causes the oil to leak out until the pressure in the cylinder equals the pressure of the low pressure side of the system. Consequently, a considerable part of the platform weight and load is absorbed in pressing the plunger against its rear stop.

If an emergency stop is made between the landings, the main valve and the leveling valve will be moved to their dead center position to prevent creepage of the plunger to either terminal under leakage through the leveling port. The cams move the valves at the terminals but the rack gear 112 on the plunger acting through the differential moves the main valve and consequently the leveling valve in an emergency stop and the farther the creep the greater the motion to move the valves to their dead center or "no creep" position. Hence in an emergency stop, the cylinder port will be completely closed and no oil will enter or leave the cylinder, thus causing the plunger and the platform to remain stationary.

The stopping cam 117 has been described as a floating cam with a spring 122 for biasing it upwardly to the limit set by its limit bolt 119, and in order to make it effectively operate the arm 124 of the T-lever, its free end must be locked or bolted to the rack rail at the time it starts its decelerating and stopping operation. It is feasible in many cases to use ordinary bolting means for fastening the cam permanently to the rack rail, but inasmuch as there are times when the viscosity of the oil or variations in the loads may cause the T-arm 124 to be out of its normal position at the time it meets the cam at the start of a valve closing action. Therefore in order to render the cam effective at whatever height best suits the position of the arm 124 under prevailing conditions, I have provided a cam lock 141 which is responsive to the position of the plunger for locking the cam 117 against the rack bar in whatever position it may be in at that time and holding it there until the valve closing action is completed.

The cam lock 141 (Figs. 14, 15, 16) has a locking block 142 welded or otherwise secured to the rack bar 113 and provided with upwardly extending teeth disposed in its side to be engaged by cooperating downwardly extending teeth in a latch 143 movably mounted by a shaft 144 disposed in a support member 149 in the cam 117. The shaft 144 is retained in the cam 117 by means of a bolt 145 which passes through a cap holder 146 mounted on the outer end of the shaft.

The latch block 143 is biased away from the lock block 142 by a spring 147 mounted on the shaft 144 between a shoulder 148 on the seating member 149 and the inner edges of the cap 146. A biasing spring 150 is also disposed around the bolt 145 between the inner portion of the shaft 144 and the inner portion of the cap 146. The use of the two springs provides a resiliently controlled means for biasing the locking latch away from the locking block and for permitting a soft and easy engagement therewith. A pair of guide blocks 151 and 152 are mounted on the cam 117 at each side of the locking latch 143 for the purpose of maintaining the latch in vertical position.

Any suitable means may be provided for causing operation of the locking latch such as a stationary cam 154 mounted on a part 155 of the engine frame in position to engage a roller 156 mounted in a lever 157 for locking the lock as the plunger approaches the end of its rearward stroke. The base end of the lever 157 is mounted on a base support 158 attached to the rack rail 113 and its other end is disposed in engagement with the outer end of the cap 146 on the cam locking device. As shown in Figs. 4 and 8, when the plunger approaches closely the end of its rear stroke, it will move the lever 157 and its roller 156 into engagement with the cam 154, thereby forcing the lever 157 against the outer end of the locking latch to move it against the locking block and thereby lock the cam 117 against any further downward movement, so that the cam 117 will present a firmly supported face to the roller 123 and thus operate the T-arm 124 to accurately slow down the plunger and shut the valve completely at the end of the rear stroke of the plunger. A similar lock operated in a similar manner by the cam 154a is also provided for the front cam 130.

Inasmuch as the valve shaft 63 extends from the valve block through the differential mechanism and the gear reducing mechanism, it is constructed in sections connected by a plurality of universal joints 153 to relieve any strain which may be incurred by the length of the shaft or misalinement of any parts with which it is associated.

The control system diagrammatically illustrated in Fig. 20 for controlling the valve motors to cause automatic operation of the elevator, includes the following relays and contactors:

80U, Up direction relay.
80D, Down direction relay.
U, Up direction contactor.
D, Down direction contactor.
6, Contactor for motor 81.
SR, Running relay.
TR, Contactor for shorting resistance in primary motor 80.
IRU, Initial limit switch up direction.
2RU, Follow up limit switch up direction.
3RU, Final limit switch up direction.
IRD, Initial limit switch down direction.
2RD, Follow up limit switch down direction.
3RD, Final limit switch down direction.
80, Starting and running motor (drives valve open).
81, Running motor (direct coupled to motor 80).

An "up" push button UB and a "down" push button DB are provided for energizing the direction relays to cause operation of the elevator in the up or the down direction, and an emergency stop button SB is provided for deenergizing them to stop the platform at any time. These push buttons should be located at some convenient station for operation by an attendant.

The "up" push button controls an up direction relay 80U and the "down" push button controls a down direction relay 80D which, in turn, control an up direction contactor U and a down direction contactor D for connecting the valve motor 80 to three alternating current supply conductors I, II and III and for preparing the circuit of the valve motor 81 for operation.

The running relay SR is connected across two of the conductors for the motor 80 so that it will be energized when the motor is energized. It is provided for the purpose of preparing the circuits of the contactor 6 and the contactor TR for operation.

The contactor 6 is responsive to operation of either one of the direction relays and the running relay and is provided for energizing the motor 81 after the motor 80 is energized. The shunting contactor TR is responsive to energization of either one of the direction relays and the running relay and is provided for short-circuiting a plurality of resistors $r1$, $r2$ and $r3$ in the circuit of the motor 80.

The initial limit switch IRU, the follow-up limit switch 2RU and the final limit switch 3RU for the up direction are electrically connected in the control circuit 35 (Fig. 13) in position to be operated by a cam 181 attached to the engine plunger as the engine moves to the end of its forward stroke. Similarly, the initial limit switch IRD, the follow-up limit switch 2RD and the final limit switch 3RD for the down direction are mounted on the engine frame 35 in position to be engaged by the cam 181 as the engine plunger nears the end of its rearward stroke.

In order to prevent operation of the valve motor control system until the other apparatus associated with the elevator is in condition for movement of the elevator platform, the circuit leading to the control contactors is provided with a pair of pump interlocks P1 and P2, a hand-drive interlock 186, a broken-rope interlock BR, a platform interlock PF and a pair of stowing guide interlocks S1 and S2. One of the pump interlocks and all the other interlocks must be in closed position before the control system can be operated to energize the valve motors to move the elevator.

At times it may be desirable to operate the engine valve by manual means instead of by the motors and their push button control system. Therefore I have provided a hand drive 159 (Figs. 10 and 11) which may be used instead of the motors and their push button control.

The motor drive is used for automatically operating the valve by up and down push buttons during normal operation and the hand drive is used for operating the valves by hand when the elevator is being stored or inched into any position or in case of failure of the motors or the power to which the motors are connected. The hand drive is much slower in operation than the motor drive and is seldom used, but either drive may be used as a motive means for operating the valve shaft 63.

The hand drive 159 (Figs. 3, 9, 10 and 11) is mounted in a casing or station 159a embodying hand-operated mechanism for operating a shaft 160, the lower end of which is connected by a pair of beveled gears 161 and 162 to the gear pinion 94 in the gear reducing mechanism 87 for driving the gear wheel 95 to rotate the main valve shaft 63.

The upper end of the operating shaft 160 is rotatably mounted in the casing 159a and a beveled gear 163 is mounted on its inner end in position to be engaged by cooperating beveled gear 164 slidably fixed on a gear shaft 165 rotatably and slidably mounted in the central portion of the casing 159a by shaft supports 165a and 165b. A hand wheel 166 is mounted on the outer end of the shaft 165 for use in rotating it. In order to provide for easy rotation of the hand wheel and the shaft, a crank arm 167, having a handle 168, is mounted on the hand wheel by a hinge joint 169 in position to rotate the hand wheel and shaft when it is moved to its outermost position. A manually releasable spring operated snap latch 170 holds the crank arm in its outer position when it is ready for operation by hand. A detent 171 is provided for releasably retaining the handle in its inoperative position.

A cover 172, connected to the casing 159a by a hinged joint connection 173, is provided for covering the hand wheel and its crank arm when they are not in use and for preventing energization of the motors while the hand drive is in use. A latch 174 is mounted in the casing 159a for latching the cover 172 in its closed position. This latch may be released when it is desired to open the cover, by operating a handle 175 which rotates a cam 176 to free the latch.

The cover 172 is pivotally connected by a link 177 to a lever 178 fulcrumed on a projection 179 on the right side of the casing (Fig. 11). The free forked end of the lever 178 is disposed in a spool 180 fixed on the rear end of the shaft 165 so that an opening movement of the door will operate the lever 178 to move the shaft 165 to the left and thereby mesh the gear wheel 164 with the gear wheel 163 to provide for rotation of the operating shaft 160 when the crank arm 167 is rotated. This movement of the gear shaft 165 moves the hand wheel 166 and its operating crank arm 167 outwardly so that they may be easily operated. A spring 182 is mounted on the shaft 165 between the spool 180 and a collar 183 to soften the engagement of the gear 164 with the gear 163 when they are moved into engagement with each other.

The shaft 165 is provided with a spool-like portion 184 near its central portion disposed to receive the forked end of a lever 185 for operating an interlock switch 186 mounted on the inner side of the casing 159a. When the gear shaft 165 is moved to the left to engage the gear 164 with the gear 163 for hand operation, it moves the lever 185 to open the switch 186 in the control circuit for the valve motors 80 and 81 (Fig. 20). When the gear 164 is disengaged from the gear 163, the movement causes the shaft to move the lever 185 to close the switch 186 so that the valve motors may be safely operated to move the main valve when the hand drive is not in use.

An electromechanical brake 190 is provided for absorbing the stored energy of the valve motors 80 and 81 when they are deenergized. If no brakes were used, the coast of the motors in slowing down would unnecessarily drag out the retardation of the platform. The brake 190 comprises a pair of brake arms 191 and 192 pivotally mounted on projections 193 on the inner side of the casing 159a to extend around and embrace a brake drum 194 formed on the skirt of the gear wheel 163. The brake arms are biased into engagement with the brake drum by a pair of brake springs 195 and 196 which are held in compression against the outer ends of the brake arms by a bolt 197. The bolt 197 passes through the brake arms to hold the springs against them by a pair of washers 198 and 199. Thus the brake levers, under the force of the brake springs, will apply sufficient force to the brake drum to lock rotation of the operating shaft 160, but a resilient connection provided by springs 95b (Fig. 9) in the clutch 95a permits a small additional rotation of shaft 63. My aforementioned copending application Serial No. 514,519, discloses such a construction more fully.

The means for releasing the brake comprises a wedge 200 disposed to enter between the outer ends of the brake arms and force them apart. The outer ends of the brake arms are provided with rollers 201 to reduce the friction between the wedging faces of the wedge and the ends of the brake levers as the wedge is forced between them to separate them. The wedge is adjustably mounted by a bolt 203 on an operating shaft 204, the upper end of which is slidably disposed in a guide projection 205 on the inner top surface of the housing 159a. The lower end of the wedge shaft 204 is pivotally connected to one end of a bell crank lever 206, mounted by a pivot pin 207 on the side of the casing 159a. The other end of the bell crank lever is pivotally connected by a link 208 to the armature 209 of an electromagnet 210 mounted on the interior of the casing 159a by a plurality of bolts 211. The electromagnet is provided with a coil 212, the terminals of which are connected across two of the supply conductors for the valve motor 80 so that energization of the valve motor 80 will energize the coil 212 for pulling the wedge 200 downwardly into its brake releasing position and thus permit the shaft 160 to rotate with the valve shaft when it is being operated by the valve motors instead of by the hand drive.

As shown, the brake 190 is released whenever the valve motors are energized to operate the main valve shaft and is applied to its brake drum whenever the valve motors are deenergized, to prevent the valve shaft from being rotated by the tendency of the valve motors to coast after being deenergized.

It is necessary also to release the brake 190 when the valve shaft is being operated by the hand drive. This is accomplished by providing a lever arm 214 on the bell crank 206 to extend into a lost motion connection 215 with the link 177 leading from the cover to the gear shifting lever 178. The lost motion connection 215 is so disposed on the link 177 that the bell crank lever 206 may be moved to brake releasing position by the electromagnet 210 without moving the link 177, but if the door or cover 172 is opened, its opening movement will push the link 177 to the right and thereby move the bell crank arm 214 in anticlockwise direction (Fig. 11) to pull downwardly on the arm 206 and thereby pull the wedge 200 between the outer ends of the brake arms 191 and 192 to spread them apart and thereby release the brake.

By the foregoing construction, it will be evident that the brake 190 will be applied to the shaft 160 to prevent rotation of the valve shaft 63 only when the hand drive cover 172 is closed, to prevent operation of the hand mechanism, and the valve motors are in deenergized condition, that is, whenever the cover is opened, the brake is released mechanically; and, with the cover closed, the brake is released when the motors are energized.

Assumed operation of the apparatus

Assuming that the elevator platform 10 is at the main deck 14 and ready for movement up to the flight deck 15, that the hand drive cover 172 is closed so that the system is subject to operation by motor control, that the interlocks including the pump interlocks P1 and P2 are closed, and that it is desired to move the platform upwardly to the flight deck, the attendant presses the up push button UB at the control station.

The closed button UB energizes the up direction relay 80U by the circuit L1, P1, 186, BR, PF, S2, S1, SB, UB, 80U, 80D1, 2RU, L3, to cause energization of the valve motors. The energized relay 80U closes its contacts 80U1, 80U3 and 80U4 and opens its back contact 80U2. The closed contacts 80U3 provide a self holding circuit for the relay. The closed contacts 80U4 prepare a circuit for the contactor 6 and the shorting relay TR. The closed contacts 80U1 energize the up direction relay by the circuit, L2, L—4, TR4, 80U1, U, 80D1, 2RU, L3. The energized relay U closes its contacts U1, U2, U3 and U4. The closed contacts U4 provide a self holding circuit for the contactor U. The closed contacts U1, U2 and U3 connect the motor 80 to the supply conductors I, II and III and thereby energize that motor through its resistors r1, r2 and r3 to start operation for opening the engine valves.

The energization of the circuits to the motor 80 energizes the running relay SR which closes its contacts SR1 and SR2, thereby energizing the motor contactor 6 and the shorting relay TR by the circuit, L2, IRU, 80U4, SR2, 6 and TR in parallel, L3.

The energized relay 6 closes its contacts 6—1, 6—2, 6—3 and opens its contacts 6—4. The closed contacts 6—1, 6—2 and 6—3 connect the motor 81 for operation and inasmuch as it is mounted on the same shaft as the motor 80, it adds its power to that of the motor 80 for rotating the shaft 63. The open contacts 6—4 open the starting circuit for the relay U, but that relay remains energized because it is connected to the conductor L+1 through the contacts 2RU and U4.

The energized relay TR closes its contacts TR1, TR2 and TR3 and opens its contacts TR4. The closed contacts TR1, TR2 and TR3 short out the resistors $r1$, $r2$ and $r3$ thus increasing the strength of the motor 80. The opening of the contacts TR4 in the already open starting circuit of the contactor U has no effect.

The energization of the motor 80 also energizes the coil 212 (Fig. 20) of the electromagnetic brake (Figs. 10 and 11) and thus raises its armature 209 which pulls upward on the link 208 to operate the lever 206 and thereby pull the wedge 200 downwardly between the outer ends of the brake levers 191 and 192. The downward movement of the wedge 200 releases the brake arms from the brake drum and leaves the operating shaft 160 free to rotate, thereby freeing the gearing mechanism 87 for rotation.

The energized motors 80 and 81 rotate their shaft 96 (Fig. 9) and thereby operate the gears 91, 92, 94 and 95 to rotate the valve shaft 63.

Inasmuch as the plunger is standing at the end of its rearward stroke, the gear rack 112, the gear wheel 111, and the nut member 101 of the differential are stationary. As the motors rotate the valve shaft 63 for up direction operation, its screw-threaded portion 106 (Fig. 17) rotates in the nut 101 which pulls the shaft axially to the left, thus moving the main piston valve 60 from its central position in the valve chamber (Figs. 5 and 6) toward the exhaust port 44 (Fig. 7) thus opening the valve ports 64c and permitting oil to flow through the high pressure port 43, the valve chamber section 64a, the ports 64c and the cylinder port 62 into the engine cylinder 34.

The movement of the main valve 60 operates the lever 77 to open the leveling valve in accordance with the opening movement of the main valve.

As the oil enters the cylinder from the pressure side of the system, the plunger starts on its forward stroke and, in doing so, moves the rack gear 112 and thereby rotates the gear 111 mounted on the shaft 108, which, in turn, rotates the gear wheels 103 and 102 and the nut 101. The rotation of the nut on the screw threaded portion 106 of the valve shaft is in the same direction as the rotation of the valve shaft; and, therefore, due to the differential action of the screw and nut, the valve shaft starts to slow up its axial movement when rotation of the nut begins.

As the plunger speeds up thus increasing the speed of the upward movement of the elevator platform, the speeds of rotation of the nut 101 and the valve shaft screw 106 approach each other. At the rate of platform speed for which the apparatus is designed, the speed of the plunger and the valve shaft will be equal.

Should the motors 80 and 81 open the valve too far, the platform and plunger overspeed thus rotating the nut 101 ahead of the screw to partially close the valve for slowing down the platform and the plunger. As soon as the screw 106 and the nut 101 reach the same speed, the platform has a uniform speed which is a function of the motor speed. Should there be any tendency to slight hunting, the opposing influences affecting the extent of valve opening rapidly come into balanced relation such that the valve is positioned for a plunger speed turning the nut 101 at the same rotational speed as the screw 106 is rotated by the motor or motors.

As the elevator approaches to within approximately forty inches of the flight deck, the slowdown cam 130 engages the roller 129 to close the valves, the cam 181 opens the initial up limit switch IRU and the cam 154a is engaged by the cam lock mechanism 141a associated with the cam 130 and forces it into locking engagement to lock the cam 130 in the position best suited to the operation of the T-lever considering the loading on the elevator and the viscosity of the oil for operating the engine and results produced thereby on the position of the T-lever as the cam 130 engages it.

The opening of the initial up limit switch IRU deenergizes the motor contactor 6 and the shorting relay TR. The deenergized contactor 6 opens its contacts 6—1, 6—2 and 6—3 and thereby deenergizes the valve motor 81. The deenergized relay TR opens its contacts TR1, TR2 and TR3, thereby reinserting the resistors $r1$, $r2$ and $r3$ in the circuit of the valve motor 80. The deenergization of the motor 81 and the decreased energization of the motor 80 provide for reduced torque exerted on the valve shaft 63.

As the plunger continues toward the end of its forward stroke the cam 130 raises the arm 128 of the T-lever and thereby forces its arm 133 to the right (Fig. 13) thus moving the coupling 78 and hence the valve shaft 63 to the right and with it the leveling valve shaft 73. The closing movement of the main valve decreases the passage for the oil into the engine cylinder and thereby decelerates the plunger.

When the platform is approximately thirty inches from the flight deck the plunger cam 181 opens the follow-up limit switch 2RU but no action follows this because this is a safety switch designed to cause an emergency stop if the up limit switch IRU fails to disconnect the motor 81 and decrease the power of the motor 80.

As the elevator platform arrives at a position within one-half inch of the flight deck the cam 181 opens the final up limit switch 3RU which deenergizes the up direction contactor U which opens its contacts U1, U2 and U3 and thereby deenergizes the valve motor 80 while it is operating at reduced torque so that it applies no further rotative power to the valve shaft 63. Furthermore, the deenergization of the motor 80 deenergizes the brake coil 212, which thereupon releases the wedge 200 from between the brake arms and permits the application of the brake by the brake springs.

Returning now to the operation of the cam 130 as it is pulled under the roller 129, the movement of the cam continued to raise the arm 128 and thereby caused the depending arm 133 to push the coupling 78 and with it the valve shaft 63 and the valve 73 to gradually decelerate the plunger to stop at the end of its forward stroke when the elevator is at the flight deck. As this decelerating action continues and T-lever moves the valve shaft 63 until the main valve gradually closes its valve ports 64c and thus stops the further flow of oil from the high pressure port 43 through the main valve ports. At the same time, the movement of the valve shaft 63 causes the lever 77 to move the leveling valve 61 toward its closed position. However, the shape of the cam 130 is such that in its "off" position for up travel, it moves the valve shaft 63 far enough to cause the valve 60 to cover its ports 64c but not quite far enough to cause the leveling valve to close its ports 74b, and the oil continues to seep through it. Hence, with the platform 10 engaging the flight deck stops 19, the plunger is moved to engage the stop 41 under full pressure, due to the leakage through the exposed portion of the leveling valve permitting pressure to build up in the engine cylinder. Thus it is assured that the cables will be tensioned to exert upward force of the platform against its stops to the desired extent.

It should also be noted that the lever 77 provides such relative movement ranges of the main and leveling valves and that the relative laps of the latter are such that the leveling valve closes slowly and trails the main valve and thereby provides a vernier-like action for securing a particularly fine degree of deceleration at the end of the up stroke.

Assuming now that the elevator platform is at the flight deck and that the attendant presses the down button DB for causing the elevator platform to return to the main deck, operation of the button DB energizes the down direction relay 80D by the circuit L2, DB, 80D, 80U2, 3RD, L3.

The energized relay 80D opens its contacts 80D1 and closes its contacts 80D2, 80D3 and 80D4. The closing of the contacts 80D3 completes a self holding circuit for the relay 80D. The closing of the contacts 80D4 prepares one part of the circuit for the relays 6 and TR. The closing of the contacts 80D2 energizes the down direction contactor D by the circuit L2, 6—4, TR4, 80D2, D, 80U2, 3RD, L3. The energized contactor D closes its contacts D1, D2, D3 and D4. The closed contacts D4 complete a self holding circuit for the relay D. The closed contacts D1, D2 and D3 energize the valve motor 80 through its resistors R1, R2 and R3.

As before, energization of the motor 80 energizes the brake coil 212 to release the brake 199 in the hand drive station. The energization of the motor 80 also energizes the running relay SR which closes its contacts SR1 and SR2, thereby energizing the contactor 6 and the shorting relay TR by the circuit L2, 80D4, SR1, 1RD, 6 and TR in parallel, L3. The energized contactor 6 closes its contacts 6—1, 6—2 and 6—3 and thereby energizes the valve motor 81 to assist the valve motor 80 in rotating the valve shaft for down operation. The energized shorting relay TR closes its contacts TR1, TR2 and TR3 and thereby short circuits the resistors r1, r2 and r3 in the circuit of the motor 80 to thereby bring the motor speed up to its maximum value in rotating the shaft 63.

The energized motors 80 and 81 now rotate the valve shaft 63 in a reverse direction through the medium of the reducing gearing mechanism 87 (previously described); and, inasmuch as the plunger is standing still at the end of its forward stroke, the nut 101 of the differential is standing still. Therefore rotation of the valve shaft 63 in the differential moves the shaft to the right and thereby causes the valve 60 to move toward the port 43 and thereby open the ports 64c, thus permitting the oil in the cylinder to flow out through the cylinder port 62, the ports 64c and the chamber section 64b into the low pressure port 44 under the pressure exerted upon the plunger by the weight of the elevator platform.

The opening movement of the valve for down operation will continue while the plunger starts moving and operating the rack rail 112, thus rotating the gear 111 to cause rotation of the nut 101 for down direction operation. As the plunger gains in speed, the speed of rotation of the nut 101 increases until it is the same as the speed of rotation of the valve shaft and the further opening movement of the valve shaft 63. As before, should there be any tendency to slight hunting, the opposing influences affecting the extent of valve opening rapidly come into balanced relation such that the valve is positioned for a plunger speed turning the nut 101 at the same rotational speed as the screw 106 is rotated by the motors.

As the elevator descends to within forty inches of the main deck, the cam 181 opens the first down limit switch 1RD and as the cam 117 comes under the roller 123 of the T-lever, it starts to raise that lever to close the valve for the down stop. Furthermore, the movement of the plunger carries the cam lever 157 underneath the fixed cam 154, thus causing operation of the lever 157 to move the locking latch 143 inwardly to lock the cam 117 in the position in which the position of the T-lever has forced it as they engage, the operation and reasons therefor having already been described in connection with the cam 130. Therefore, regardless of the exact position of the arm 124 immediately after it is contacted by the cam 117, the cam will be locked in that position so that its free end will not move any lower but will remain where it is and its upper surface will serve to raise the T-arm lever 124 at the desired rate for closing engine valves as the plunger moves into its rearward position with the elevator reaching the main deck.

When the cam 181 opened the limit switch 1RD that limit switch deenergized the motor contactor 6 to deenergize the valve motor 81. The opened switch 1RD also deenergized the shorting relay TR which opened its contacts TR1, TR2 and TR3 and thereby reinserted the resistors r1, r2 and r3 in the circuit of the motor 80 so that the power of the motor 80 on the valve shaft 63 is decreased to a small amount.

As the plunger continues to the end of its rearward stroke it successively opens the limit switch 2RD and 3RD to deenergize the control contactor and the valve motors in the same manner as previously explained at the end of the forward stroke of the plunger.

As the plunger nears the end of its rearward stroke the shape of the cam 117 so operates the T-lever that it forces the valve shaft 63 to the point where the main valve closes the valve port 64c and at the same time the valve shaft 63 causes the lever 77 to move the leveling valve toward its closed position, but, because of the shape of the cam 117, it does not force the valve levers to quite close the leveling valve. Depending on the shape of the cam, the motor shaft may slow down, may stop dead, or may even be reversed during this operation.

The gradual closing of the ports 64c by the main valve and the port 74b by the leveling valve reduces the rate of exhausting the oil and thus slows down the platform. Finally the plunger strikes its rearward stop block 51 (Fig. 2) but the leveling valve does not fully close with the result that liquid leaks out of the cylinder until the pressure equals that of the low pressure side of the system. Consequently, a considerable part of the platform weight and load will press the plunger against its rearward stop and thus hold the platform firmly at the main deck.

The foregoing operations describe how the pressing of an up push button will cause the hydraulic engine to move the elevator from the main deck to the plate deck and, also, how the pressing of the down push button will cause the hydraulic engine to move the elevator from the flight deck down to the main deck and stop it thereat.

In case of an emergency while the motor control system is being used for operating the elevator, the elevator may be stopped by pressing the emergency stop button SB. Assuming that this button is pressed for an emergency stop, it deenergizes the circuit for the direction contactors regardless of the direction of operation. The deenergization of either direction contactor U or D deenergizes the valve motors 80 and 81 and also the brake 190, so that rotation of the valve shaft 63 by the motors is stopped. Meanwhile, the plunger in the cylinder continues its movement for a short distance and this movement operates the gear rack 112 to rotate the gear 111 on the shaft 108 (Fig. 17) which in turn operates the gear wheels 103 and 102 to rotate the nut 101 on the screw 106.

Inasmuch as the shaft 63 is prevented from rotation, the rotation of the nut 101 will move the shaft 63 axially until it causes the main valve 60 to close its ports 64c. The main valve 60 will close before the leveling valve 61 closes and oil will continue to seep through the port 74b until the operation of the differential by the plunger moves the valve 60 and the valve 61 to their dead center position. In this position, the ports 74b and 64c will be completely closed and no oil can flow into or out of the engine cylinder 34. Hence, with the valves on dead center, the plunger will stop moving and thereby bring the elevator platform to a stop.

It will be assumed now that the attendant desires to move the elevator by the hand control 159 instead of by the push-button control. In order to accomplish this, the attendant turns the handle 175 on the hand control and opens the cover 172. The opening of the cover 172 pushes the link 177 to the right (Figs. 10 and 11) thereby operating the lever 178 to push the slidable rotatable shaft 165 to the left. This movement of the shaft 165 meshes the gear wheel 164 with the gear wheel 163, moves the switch arm 185 to the left to open the interlocking switch 186 in the push-button control system, and moves the hand wheel 166 with its crank 168 into open position on the side of the hand control casing.

The attendant then moves the crank arm 167 to its open position where the snap latch 170 engages the hand wheel 166 and holds the crank arm in cranking position. The opening of the switch 186 opens the control circuit (Fig. 20) so that the push-button control system cannot be used while the hand drive is in operation.

The opening movement of the cover 172 in moving the link 177 also causes that link to engage the lost motion connection 215 on the arm 214 of the crank lever 206 and thereby move that lever in counterclockwise direction which pulls downwardly on the shaft 204 and thereby moves the brake wedge 203 in between the outer ends of the brake arms 191 and 192. This operation of the brake wedge frees the brake arms from the brake drum 194 so that the gear 163 and the shaft 160 may be operated by rotation of the crank arm 167. Thus, it will be apparent that the opening of the hand-drive cover 172 not only opens the interlock in the electric control system but also releases the brake 190 from holding the shaft 160 and, consequently, the valve shaft 63 against rotation.

It will be assumed now that the attendant grasps the crank handle 168 and rotates the crank arm 167 in the correct direction for moving the elevator in the direction he wishes it to move. This rotation of the crank shaft rotates the shaft 165 and with it the gear 164 in mesh with the gear 163, and thereby rotates the operating shaft 160 so that the gear wheel 161 on the lower end of the shaft in mesh with the gear 162 on the shaft 93 rotates the pinion 94, the gear wheel 95, and with it the shaft 63. The rotation of the shaft 63 in the differential 83 will cause it to move axially in accordance with the direction in which the elevator is to be moved in the same manner as when the valve shaft 63 was operated by the electric motors 80 and 81.

Inasmuch as the rotation of the valve shaft 63 and the differential is the cause of moving it axially, it will be apparent that the crank arm 167 must be turned constantly to keep the elevator in movement. Of course the differential will be moved to some extent by the operation of the rack gear 112 on the plunger but not enough to noticeably affect the axial movement of the gear shaft 63. Inasmuch as the gear shaft 63 must be rotated by the hand device in order to move it axially, this adds a safety element for hand operation, because stopping the hand rotation of the hand drive crank will immediately stop the elevator. The hand operation drive may drive the elevator as fast as the motor control drive does, but experience shows it is difficult to continue this speed. A slower turning of the hand wheel will yield say half speed. A very slow turning will provide an "inching" speed for fine adjustment, and for "inching" purposes during a stowing or other operation of the elevator platform. The hand drive may be used at any time for normal operating purposes, if the motors fail or the electric power is shut off so that the electric drive cannot be used.

In the modified form of my invention illustrated in Fig. 22, I have illustrated a modification of my invention in which the valve shaft 63a as operated to control an inlet port 43b and an outlet port 44b for controlling a hydraulic engine (not shown) such as the engine 18 for operating an elevator platform 19a by a plurality of hoisting cables 16a and 17a.

The valve shaft is controlled by a constant speed electric motor 80a, a differential mechanism 83a and a pair of stop cams 117a and 130a. The motor is connected to the shaft by a gear reducing mechanism 87a and a flexible coupling 95d. The differential comprises a nut 101c disposed on a screw portion 106a of the shaft and operated by a gear rack 112a attached to the elevator platform. Suitable collars 104a and 105a are mounted at the ends of the nut 101c to prevent axial movement thereof. The cams 117a and 130a are mounted on a shaft 217 attached to the elevator platform.

When the platform is to be moved, the motor 80a is energized to rotate the shaft 63a in the nut 101c. When the platform is standing still, this causes the shaft to open the valves in the valve block 40a for starting the platform in motion. As the platform starts to move, say in the up direction, it moves the gear rack 112a and thus rotates the nut 101c on the screw 106a and thus so controls the valve shaft that the platform accelerates to and moves at the normal speed for which the control is designed.

When the platform arrives at its upper floor (not shown), it causes its cam 117a to operate the ball crank 218 to pull the valve shaft 63a to its valve-closing position, thus effecting the stopping of the platform. Hence it will be apparent that this modified form of the invention operates in the same manner as the form hereinbefore disclosed, except that the gear for operating the nut part of the differential is attached directly to the platform, and the cams for moving the valve shaft to its valve closing position are attached directly to the platform, so that the platform instead of the plunger is used to control them.

Fig. 23 illustrates a modified form 64e of the valve port 64c. In this modified form, the tapered ends 64f may be elongated into slots 64g so as to provide a more refined progressive opening or closing of the ports than is possible with the blunter tapered ends of the ports 64c and hence a still smoother starting and stopping of the plunger.

By the foregoing description it will be apparent that I have provided an automatic push-button control system of few parts which will give smooth, accurate starting, accelerating, decelerating and stopping operation of extremely large elevators, draw bridges, etc., which are operated by hydraulic engines.

It will also be apparent that I have provided a safe, simple and effective interlocking means for substituting a hand drive for the automatic push-button drive when it is desirable for any reason to operate the apparatus by manual control instead of by automatic push-button control.

The term "port," as used herein with reference to the cylinder ports 64c for the main valve or the cylinder ports 74b for the vernier valve, has the significance, in each case, of one or more such ports.

Although I have illustrated and described only one specific embodiment and one modification of my invention, it is to be understood that many changes therein and additional modifications thereof may be made without departing from the spirit and scope of the invention as defined by the appended claims.

I claim as my invention:

1. In a control system for a hydraulic engine having a cylinder and a plunger, valve means for the cylinder, a motive means operating independently of the engine, a nut operated by movement of the plunger, means including a screw meshing with the nut and responsive to the operation of the nut and operation of the motive means for controlling opening of the valve means, and mechanism operated by the plunger as it approaches stroke ends for moving the valve means in a closing direction independently of said responsive action of the screw to control such valve means.

2. In a control system for hydraulically-operated apparatus having a movable component including a piston element cooperating with means to define a displacement chamber, movable in one direction against load with admission of motive liquid to the chamber, and movable in the other direction by load with discharge of liquid from the chamber: a nut member restrained from axial movement and rotated by the movable component, a screw member engaging the nut member, controlling means for rotating the screw member, valve means operated by axial movement of the screw member for controlling the flow of liquid into and out of the chamber, and means operated by the movable component for stopping the latter in predetermined positions including mechanism for moving the valve means in a closing direction independently of action thereon of the nut member and of the controlling means.

3. In a control system for hydraulically-operated apparatus having a movable component including a piston element cooperating with means to define a displacement chamber, movable in one direction against load with admission of motive liquid to the chamber, and movable in the other direction by load with the discharge of liquid from the chamber: a nut member restrained against axial movement and rotated by the movable component, a screw member engaging the nut member, controlling means for rotating the screw member, valve means connected to the screw member and utilizing axial movement of the latter for controlling the flow of liquid into and out of the chamber, the threads of said nut and screw members having such steep pitch that the screw member may be forcibly moved axially through the nut member, and means operated by the movable component as it approaches predetermined positions for moving the screw member axially, independently of action of the nut member and of the controlling means thereon, to move the valve means in a closing direction.

4. In a control system for a hydraulic engine having a cylinder and a plunger operable in the cylinder, valve means for controlling the flow of a hydraulic medium into and out of the cylinder for operating the plunger, a motive means operative independently of the plunger, a mechanism operated by the plunger, means responsive to operation of the motive means and the mechanism for operating the valve means such that the motive means tends to open and the mechanism tends to close the valve means to cause movement of the plunger, and apparatus for stopping the plunger at stroke ends including mechanical means operated in response to movement of the plunger as it approaches stroke ends for moving the valve means in a closing direction independently of said mechanism and said motive means.

5. In a valve control system for a hydraulic engine having a cylinder and a plunger operable in the cylinder, a main valve and a leveling valve for controlling the flow of a hydraulic medium into and out of the cylinder, said valves providing a flow area which increases and decreases such that at least the initial portion of increase occurs at an increasing rate in relation to main valve travel and at least the final portion of decrease occurs at a decreasing rate in relation to main valve travel, a motive means operable independently of the engine, a gear mechanism operable by the plunger, means responsive to operation of the motive means and operation of the gear mechanism for moving the main valve and the leveling valve such that the motive means tends to increase and the gear mechanism tends to decrease the flow area of the valves to accelerate the plunger to a speed dependent upon that of the motive means and to operate the plunger at such speed, and mechanical means operated by the plunger as it approaches stroke ends for moving the main valve to a closed position and for moving the leveling valve to a partially closed position independently of the action of said motive means and the gear mechanism to decelerate the plunger.

6. In a control system for a hydraulic engine having a cylinder and a plunger operable therein, stops mounted on the engine for limiting the forward and rearward strokes of the plunger, a main valve and a vernier valve for controlling the flow of a hydraulic medium into and out of the cylinder, said valves providing a flow area which increases and decreases such that at least the initial portion of increase occurs at an increasing rate in relation to the main valve travel and at least the final portion of decrease occurs at a decreasing rate in relation to main valve travel, a motive means operable in independently of the engine, a gear mechanism connected to and operated by the plunger, means responsive to operation of the motive means and operation of the gear mechanism for operating the valves such that the motive means tends to increase and the gear mechanism tends to decrease the flow area of the valves to accelerate the plunger to a speed determined by that of the motive means and to operate the plunger at such speed and apparatus for stopping the plunger at stroke ends including mechanical means operated by the plunger as it approaches stroke ends for moving the main valve to a closed position and for moving the vernier valve to a partially closed position, independently of the action of the motive means and of the gear mechanism to decelerate the plunger until the latter engages a stop with the main valve closed and the vernier valve partially closed.

7. In a control system for a hydraulic engine having a cylinder and a plunger operable in the cylinder, valve means providing a flow area for controlling the flow of a hydraulic medium into and out of the cylinder for operating the plunger, a reversible electric motor, a gear mechanism operated by the plunger, means responsive to operation of the motor and operation of the gear mechanism for operating the valve means such that the motor tends to increase and the gear mechanism tends to decrease the flow area thereof to accelerate the plunger to a speed determined by that of the motor and to operate the plunger at such speed, and apparatus for stopping the plunger at stroke ends including means operated as stroke ends are approached to move the valve means in a closing direction independently of the motor and the gear mechanism to decelerate the plunger until the latter reaches a stroke end with the valve means nearly closed, said valve means being formed to provide a flow area whose increase begins at an increasing rate in relation to valve travel and whose decrease ends at a decreasing rate in relation to valve travel so that the increase is effective to rapidly and smoothly accelerate the plunger from a state of rest to the speed determined by the motor and the stopping apparatus is effective to move the valve means to decrease the flow area so as to rapidly and smoothly decelerate the plunger from the speed determined by the motor until it is brought to rest and said motor being capable of being stalled and turned reversely due to the effort exerted thereon by the gear mechanism as the plunger is brought to a stop.

8. In a control system for a hydraulic engine having a cylinder and a plunger operable in the cylinder, valve means providing a flow area for controlling the flow of a hydraulic medium into and out of the cylinder to operate the plunger, a reversible electric motor, manually-rotatable controlling means, a gear mechanism operated by the plunger, means responsive to operation of the motor or of the controlling means and the gear mechanism for operating the valve means such that the motor or the controlling means tends to increase and the gear mechanism tends to decrease the flow area of the valve means to accelerate the plunger to a speed determined by that of the motor or of the controlling means and to operate the plunger at such speed, and apparatus for stopping the plunger at stroke ends including mechanical means operated by the plunger as it approaches the end of each stroke for moving the valve means in a closing direction independently of said motor or said controlling means and the gear mechanism to decelerate the plunger until such valve means is nearly closed when the stroke end is reached, said valve means providing a flow area whose increase begins at an increasing rate in relation to valve travel and whose decrease ends at a decreasing rate in relation to valve travel so that the increase in flow area at an increasing rate is effective to rapidly and smoothly accelerate the plunger from a position of rest to the speed determined by the motor or the controlling means and the stopping apparatus is effective to move the valve means to decrease the flow area so as to rapidly and smoothly decelerate the plunger from said speed determined by the motor or the controlling means until it is brought to rest and said motor being capable of being stalled and turned reversely due to effort exerted thereon by the motor as the plunger is brought to a stop.

9. In a control system for hydraulically-operated apparatus having a movable component including a piston element cooperating with means to define a displacement chamber, movable in one direction against load with admission of motive liquid to the chamber, and movable in the other direction by load with discharge of liquid from the chamber: valve means movable to control the flow of motive liquid into and out of the chamber; means for opening the valve means and controlling the extent of opening thereof comprising a differential, manually-operable means for applying input motion to the differential, reversible electric motor means for applying input motion to the differential, means utilizing the movable component to apply input motion to the differential, means operative to render either the manually-operable means or the motor means effective and the other thereof ineffective, and means utilizing output motion of the differential to move said valve means so that input motion either of the manually-operable means or of the electric motor means causes the valve means to move in an opening direction and input motion of the movable component causes the valve means to move in a closing direction; and apparatus for stopping the movable component in predetermined positions including means responsive to movement of the movable component for moving the valve means independently of said differential inputs and in a closing direction as each position is approached.

10. In a control system for hydraulically-operated apparatus having a movable component including a piston element cooperating with means to define a displacement chamber, movable in one direction against load with admission of motive liquid to the chamber, and movable in the other direction by load with discharge of liquid from the chamber: valve means movable to control the flow of motive liquid into and out of the chamber; means for opening the valve means and controlling the extent of opening thereof comprising a differential, reversible electric motor means for applying input motion to the differential, means utilizing the movable component to apply another input motion to the differential, and means utilizing output motion of the differential to move said valve means such that the motor means input thereto causes the valve means to move in an opening direction and movable component input thereto causes the valve means to move in a closing direction; manually-controlled means for initiating operation of the motor means in either direction; apparatus for stopping the movable component in predetermined positions including means operated by the movable component as it approaches each position for moving the valve means in a closing direction independently of the differential inputs; means for interrupting the supply of electrical energy to the motor means as each position is nearly approached; a brake for the motor means; and means responsive to energization of the motor means to release the brake and to deenergization thereof to apply the brake.

11. In a control system for hydraulically operated apparatus having a component movable between stop positions and including a piston element cooperating with means to define a displacement chamber, movable toward one stop position and against load with admission of motive liquid to the chamber, and movable toward the other stop position by load with discharge of liquid from the chamber: valve means including a valve member movable to provide a flow area controlling the flow of motive liquid into and out of the chamber; said valve means being constructed and arranged to provide a flow area which, with movement of the valve member, increases and decreases in such manner that at least the initial portion of increase occurs at an increasing rate in relation to valve member travel and at least the final portion of decrease occurs at a decreasing rate in relation to valve member travel; reversible motor means; follow-up means operated by said movable component; means responsive to movement of the motor means to move the valve member to increase the flow area of the valve means and responsive to movement of the follow-up means to decrease the flow area of the valve means so that, upon initiation of operation of the motor means, the flow area is increased so as to include said initial portion of increase at an increasing rate in relation to valve member travel to accelerate the movable component until, due to action of the motor means and of the follow-up means, the flow area is sufficient for movement of the movable component at a speed dependent upon that of the motor means; and apparatus for stopping the movable component in predetermined positions and including means utilizing motion of the movable component for moving the valve member in a closing direction independently of the motor means and of the follow-up means to decrease the flow area of the valve means so as to include said final portion of decrease at a decreasing rate in relation to valve member travel to decelerate the movable component as each stop position is approached.

12. In a control system for hydraulically-operated apparatus having a movable component including a piston element arranged in a cylinder, valve means including a valve member movable in opening and closing directions to provide a flow area controlling the flow of motive liquid into and out of the cylinder; reversible motor means; follow-up means operated by the movable component; means responsive to movement of the motor means to move the valve member to increase the flow area of the valve means and responsive to movement of the follow-up means to move the valve member to decrease the flow area of the valve means so that, upon initiation of operation of the motor means, the flow area is increased to accelerate the movable component until, due to action of the motor means and of the follow-up means, the flow area is sufficient for movement of the movable component at a speed dependent upon that of the motor means; and means for stopping the movable component in predetermined positions and including cams operated by the movable component for moving the valve member independently of the motor means and of the follow-up means to decrease the flow area of the valve means so as to decelerate the movable component as each position is approached.

13. Apparatus as claimed in claim 12 with means providing for adjustment of each cam so that its lift may suit the extent to which the valve member has been moved in an opening direction to provide for substantially full utilization of the lift surface in effecting movement of the valve member in a closing direction.

14. In a control system for hydraulically-operated apparatus having a movable component including a piston element arranged in a cylinder, valve means including a valve member movable in opening and closing directions to provide a flow area controlling the flow of motive liquid into and out of the cylinder; reversible motor means; follow-up means operated by the movable component; means responsive to movement of the motor means to move the valve member to increase the flow area of the valve means and responsive to movement of the follow-up means to move the valve member to decrease the flow area of the valve means so that, upon initiation of operation of the motor means, the flow area is increased to accelerate the movable component until, due to action of the motor means and of the follow-up means, the flow area is sufficient for movement of the movable component at a speed dependent upon that of the motor means; and means for stopping the movable component in predetermined positions and including cams operated by the movable component and follower mechanism movable with the valve member and operated by the cams for moving the valve member independently of the motor means and of the follow-up means to decrease the flow area of the valve means so as to decelerate the movable component as each position is approached.

15. In a control system for hydraulically-operated apparatus having a movable component including a piston element arranged in a cylinder, valve means including a valve member movable in opening and closing directions to provide a flow area controlling the flow of motive liquid into and out of the cylinder; reversible motor means; follow-up means operated by the movable component; means responsive to movement of the motor means to move the valve member to increase the flow area of the valve means and responsive to movement of the follow-up means to move the valve member to decrease the flow area of the valve means so that, upon initiation of operation of the motor means, the flow area is increased to accelerate the movable component until, due to action of the motor means and of the follow-up means, the flow area is sufficient for movement of the movable component at a speed dependent upon that of the motor means; and means for stopping the movable component in predetermined positions and including cams operated by the movable component, follower mechanism movable with the valve member and operated by the cams for moving the valve member independently of the motor means and of the follow-up means to decrease the flow area of the valve means so as to decelerate the movable component as each position is approached, means utilizing the follower mechanism to adjust each cam so that its lift is suitable to the extent to which the valve member has been moved in an opening direction so that the lift surface may be substantially fully utilized in effecting closing movement of the valve member, and means for locking each cam in adjusted position immediately following adjustment thereof.

16. In a control system for hydraulically-operated apparatus having a component movable between stop positions and including a piston element arranged in a cylinder, valve means including a valve member movable in opening and closing directions to provide a flow area controlling the flow of motive liquid into and out of the cylinder; said valve being constructed and arranged to provide a flow area which, with movement of the valve member, increases and decreases in such manner that at least the initial portion of increase occurs at an increasing rate in relation to valve member travel and at least the final portion of decrease occurs at a decreasing rate in relation to valve member travel; reversible motor means; follow-up means operated by the movable component; means responsive to movement of the motor means to move the valve member to increase the flow area of the valve means and responsive to movement of the follow-up means to move the valve member to decrease the flow area of the valve means so that, upon initiation of operation of the motor means, the flow area is increased so as to include said initial portion of increase at an increasing rate in relation to valve member travel to accelerate the movable component until, due to action of the motor means and the follow-up means, the flow area is sufficient for movement of the movable component at a speed dependent upon that of the motor means; and means for stopping the movable component at said positions and including a pair of cams operated by the movable component and follower mechanism movable with the valve member and actuated by the cams for moving the latter independently of the motor means and of the follow-up means to decrease the flow area of the valve means so as to decelerate the movable component as each position is approached; each cam having a rearward portion whose lift rate increases in relation to cam travel to cause the valve member to move at an increasing rate in a closing direction during said final portion of decrease of flow area at a decreasing rate in relation to valve member travel to provide for deceleration of the movable component of such character that the latter may be rapidly brought to a stop with a minimum of shock.

17. In a control system for hydraulically-operated apparatus having a component movable between stop positions and including a piston element arranged in a cylinder; valve means including a valve member movable in opening and closing directions to provide a flow area controlling the flow of motive liquid into and out of the cylinder; reversible motor means; follow-up means operated by the movable component; means responsive to movement of the motor means to move the valve member to increase the flow area of the valve means and responsive to movement of the follow-up means to move the valve member to decrease the flow area of the valve means so that, upon initiation of operation of the motor means, the flow area is increased to accelerate the movable component until, due to action of the motor means and the follow-up means, the flow area is reduced sufficiently for movement of the movable component at a speed dependent upon that of the motor means; and apparatus for stopping the movable component in said positions including a pair of cams operated by the movable component, a T-lever movable with the valve member, and follower elements carried by oppositely-extending arms of the T-lever and which are actuated by the cams for moving the lever and the valve member independently of the motor means and of the follow-up means to decrease the flow area of the valve means so as to decelerate the movable component as each of said positions is approached.

18. In a control system for hydraulically-operated apparatus having a component movable between stop positions and including a piston element cooperating with means to define a displacement chamber, movable against load in one direction with admission of motive liquid to the chamber, and movable in the other direction by load with discharge of liquid from the chamber: valve means including main and vernier valves cooperating with ports to provide a flow area controlling the flow of motive liquid into and out of the chamber; said main valve having larger lap with respect to its port or ports than has the vernier valve with respect to its port or ports and the port or ports for the main valve having tapered ends; mechanical connecting means between the valves and operative to provide for a range of movement of the vernier valve having such relation to that of the main valve that, with the latter moving in lapping relation with respect to its port or ports, the vernier valve may partially close its port or ports to provide for flow of motive liquid into or out of the chamber; reversible motor means; follow-up means operated by the movable component; means responsive to movement of the motor means to move the valves to increase the flow area thereof and responsive to movement of the follow-up means to reduce the flow area thereof so that, upon initiation of operation of the motor means, the flow area is increased to accelerate the movable component until, due to action of the motor means and the follow-up means, the flow area is sufficient for movement of the movable component at a speed dependent upon that of the motor means; and means for stopping the movable component at said positions including a pair of oppositely-directed cams operated by the movable component and follower mechanism movable with the mechanically-connected valves and operated by the cams to move the valves in a port-closing direction to decelerate the movable component so that the main valve laps its port or ports when stop positions are reached and the vernier valve partially closes its port or ports to restrict the flow of liquid into the chamber at one stop position and out of the chamber at the other stop position.

19. Apparatus as claimed in claim 18 with means for adjusting the mechanical connecting means for the valves so that the range of movement of the vernier valve may be shifted in relation to its port or ports.

20. Apparatus as claimed in claim 18 with means for adjusting the mechanical connecting means for the valves so that the movement range ratio of the valves may be varied.

21. Apparatus as claimed in claim 18 wherein each cam is provided with a rearward portion whose rate of lift increases in relation to its travel to accelerate closing movement of the valves beginning approximately at the time the main valve starts to cover tapered port end or ends.

22. In a control system for a hydraulically-operated elevator having a movable component including a platform operatively connected to a plunger arranged in a cylinder, reversible electric motor means, a nut member restrained from axial movement and rotated by said movable component, a screw member meshing with the nut member, transmission means rotated by the motor means and rotating the screw member and constructed and arranged to provide for axial movement of the latter, the threads of the nut and screw members having such steep pitch that the screw member may be forcibly moved axially through the nut member, valve means movable with the screw member to control the flow of motive liquid into the cylinder for upward travel of the platform and out of the cylinder for downward travel thereof, and apparatus for stopping the platform in predetermined positions including means responsive to movement of the movable component to move the screw member axially and independently of the nut member and the motor means to move the valve means in a closing direction.

23. Apparatus as claimed in claim 22 wherein the transmission means includes a long pinion driven by the motor means and meshing with a gear connected to the screw member.

24. In a control system for a hydraulically-operated elevator having a movable component including a platform operatively connected to a plunger arranged in a cylinder, reversible electric motor means; a nut member restrained from axial movement and rotated by said movable component; a screw member meshing with the nut member; the threads of the nut and screw members having such steep pitch that the screw member may be forcibly moved axially through the nut member; transmission means rotated by the motor means and rotating the screw member and constructed and arranged to provide for axial movement of the latter; valve means movable with the screw member to control the flow of motive liquid into the cylinder for upward travel of the platform and out of the cylinder for downward travel thereof; manually-controlled means for initiating operation of the motor means in either direction; a brake for the motor means; means for applying the brake when the motor means is deenergized and for releasing it when the motor means is energized; and apparatus for stopping the platform in predetermined positions including means responsive to movement of the movable component to move the valve means in a closing direction and means for interrupting the supply of electrical energy to the motor means when the platform nearly reaches each position.

25. Apparatus as claimed in claim 24 wherein the transmission means includes a long pinion driven by the motor, a gear meshing with the long pinion, and a coupling connecting the gear and screw member and constructed and arranged to relieve the latter of shocks and to provide, with the brake applied, for rotary movement of the screw member relative to the gear and incidental to axial movement of such screw member relative to the nut member.

26. In a control system for a hydraulically-operated elevator having a movable component including a platform operatively connected to a plunger arranged in a cylinder, reversible electric motor means, a nut member restrained from axial movement and rotated by said movable component, a screw member meshing with the nut member, transmission means rotated by the motor means and rotating the screw member and constructed and arranged to provide for axial movement of the latter, valve means moved by the screw member as the latter moves axially to control communication of a cylinder port with a port supplied with high-pressure liquid for upward travel of the platform and with a port supplied with liquid at lower pressure for downward travel of the platform, and apparatus for stopping the platform in predetermined positions and including means operating in response to movement of the movable component and independently of said nut member and motor means for moving the valve means in a closing direction such that upward travel is stopped with communication of the cylinder port with the high-pressure port nearly interrupted and downward travel is stopped with communication of the cylinder port with the low-pressure port nearly interrupted.

27. In a control system for an elevator having a movable component including a platform operatively connected to a plunger arranged in a cylinder, reversible motor means, a nut member restrained from axial movement and rotated by the movable component, a screw member meshing with a nut member, transmission means rotated by the motor means and rotating the screw member and constructed and arranged to provide for axial movement of the latter, valve means for controlling the flow of motive liquid into and out of the cylinder for upward and downward movements of the platform and movable in response to axial movement of the screw member such that rotation of the latter causes the valve means to move in an opening direction and rotation of the nut member causes the valve means to move in a closing direction, said valve means being constructed and arranged to provide a flow area which increases at an increasing rate in relation to valve means travel at the beginning of each platform movement to provide for a desired acceleration of the movable component to a speed dependent upon the motor means speed and which decreases at a decreasing rate in relation to valve means travel as the end of each platform movement is approached, said nut and screw members having threads of such steep pitch that the screw member may be forcibly moved axially through the nut member, and mechanism for stopping the platform in predetermined positions including means responsive to movement of the movable component as each position is approached for moving the screw member axially and independently of the nut member and the motor means to move the valve means in a closing direction until it is nearly closed when the position is reached and in such manner that closing movement is accelerated during the time that the flow area is being decreased at a decreasing rate so as to decelerate the movable component rapidly and smoothly and minimize shock incident to the platform reaching a stop position.

28. In a control system for a hydraulically-operated elevator having a movable component including a platform operatively connected to a plunger arranged in a cylinder, valve means operative to connect the cylinder to a high-pressure liquid supply for upward movement of the platform and operative to connect the cylinder to a low-pressure liquid supply for downward movement of such platform; a reversible motor; an axially-movable valve shaft; transmission means connecting the motor and the valve shaft and arranged to provide for axial movement of the latter relative to the former; a nut member restrained from axial movement and rotated by said movable component; said valve shaft including a screw portion engaging said nut member and the threads of the nut member and of the screw portion having such steep pitch that the screw portion may be forcibly moved axially through the nut member; said valve means including a piston valve movable with the valve shaft; and means for stopping the movable component in predetermined positions with the valve means nearly closed and including follower mechanism movable in opposite directions and connected to the valve shaft to move the latter axially, and cams movable with the movable component to actuate the follower mechanism as said predetermined positions are approached for moving the valve shaft axially in order to move the valve means in a closing direction.

29. In a control system for a hydraulically-operated elevator having a movable component including a platform operatively connected to a plunger arranged in a cylinder, reversible electric motor means; piston and vernier valves cooperating with cylinder, high-pressure and low-pressure ports to control the flow of motive liquid from the high-pressure ports into the cylinder for upward movement of the platform and to control the flow of such liquid out of the cylinder to the low-pressure ports for downward movement of the platform; means utilizing the piston valve to move the vernier valve and such means and the valves being constructed and arranged so that, with the piston valve moving in lapping relation with respect to its cylinder port, the vernier valve may move from a position partially opening its cylinder port to one of its high-pressure and low-pressure ports to a position partially opening the first port to the other of the latter ports; an axially-movable valve shaft having the piston valve connected thereto to move therewith; transmission means connecting the motor means and the valve shaft and arranged to provide for axial movement of the latter relative to the former; a nut member restrained from axial movement and rotated by said movable component; said valve shaft including a screw portion engaging said nut member and the threads of the nut member and of the screw portion having such steep pitch that the screw portion may be moved axially through the nut member with forcible axial movement of the valve shaft independent of the nut member and of the motor means; and apparatus for stopping the platform in predetermined positions with the piston valve closed and the vernier valve nearly closing opening of its cylinder port to its high-pressure port when upward movement of the platform is stopped and nearly closing opening of its cylinder port to its low-pressure port when downward movement of the platform is stopped and said apparatus including follower means connected to move with the valve shaft as the latter moves axially and cams operated by the movable component to actuate the follower means as said predetermined positions are approached for moving the valve shaft axially in order to move the valves in a closing direction.

30. Apparatus as claimed in claim 29, wherein the piston valve and its cylinder port are constructed and arranged to provide a flow area which increases at an increasing rate in relation to valve travel during at least the initial portion of movement of the valve to uncover the port and which decreases at a decreasing rate in relation to valve travel at least during the final portion of movement of the valve to cover the port and wherein each cam has its rearward portion formed to accelerate travel of the valve during said final portion of its movement to cover the port.

31. Apparatus as claimed in claim 29, wherein the piston valve and its cylinder port are constructed and arranged to provide a flow area which increases at an increasing rate in relation to valve travel during at least the initial portion of movement of the valve to uncover the port and which decreases at a decreasing rate in relation to valve travel at least during the final portion of movement of the valve to cover the port and wherein each cam has its rearward portion formed to accelerate travel of the valve during said final portion of its movement to cover the port, with means for initiating the supply of electrical energy to the motor means, means for interrupting the supply of electrical energy to the motor means as each platform position is nearly reached, a brake for the motor means, and means for applying the brake in response to deenergization of the motor means and for releasing it in response to energization thereof.

32. In a control system for a hydraulically-operated elevator having a movable component including a platform operatively connected to a plunger arranged in a cylinder, reversible electric motor means; piston and vernier valves cooperating with cylinder, high-pressure and low-pressure ports to control the flow of motive liquid from the high-pressure ports into the cylinder for upward movement of the platform and to control the flow of such liquid out of the cylinder to the low-pressure ports for downward movement of the platform; means utilizing the piston valve to move the vernier valve and such means and the valves being constructed and arranged so that, with the piston valve moving in lapping relation with respect to its cylinder port, the vernier valve may move from a position partially opening its cylinder port to one of its high-pressure and low-pressure ports to a position partially opening the first port to the other of the latter ports; an axially-movable valve shaft having the piston valve connected thereto to move therewith; transmission means connecting the motor means and the valve shaft and arranged to provide for axial movement of the latter relative to the former; a nut restrained from axial movement and rotated by said movable component; said valve shaft including a screw portion engaging said nut member and the threads of the nut member and of the screw portion having such steep pitch that the screw portion may be moved axially through the nut member with forcible axial movement of the valve shaft independent of the nut member and of the motor means; said cylinder port for the piston valve having tapered ends so that, as such ends are uncovered by the piston valve, the flow area increases at an increasing rate in relation to piston valve travel to provide for acceleration of the movable component; means for stopping the platform in predetermined positions with the piston valve closing its cylinder port and the vernier valve nearly closing opening of its cylinder port to its high-pressure port when upward movement of the platform is stopped and nearly closing opening of such cylinder port to its low-pressure port when downward movement of the platform is stopped and said means including follower mechanism connected to move with the valve shaft when the latter moves axially and cams movable with the movable component to actuate the follower mechanism as said predetermined positions are approached for moving the valve shaft axially in order to move the valves in a closing direction and in such manner that the piston valve covers a tapered cylinder port and so as to smoothly and rapidly decelerate the movable component; means for interrupting the supply of electrical energy to the motor means as each of said platform positions is approached; a brake for the motor means; means for applying the brake in response to deenergization of the motor means and for releasing it in response to energization thereof; said transmission means connecting the motor means and the shaft including an elongated pinion driven by the motor means, a gear meshing with the pinion, and a coupling for connecting the gear to the valve shaft and providing for rotation of the latter relative to the gear incident to axial movement of such valve shaft with the brake applied and opposing rotary movement of the gear.

33. In a control system for a hydraulically-operated elevator having a movable component including a platform operatively connected to a plunger arranged in a cylinder, reversible electric motor means; piston and vernier valves cooperating with cylinder, high-pressure and low-pressure ports to control the flow of motive liquid from the high-pressure ports into the cylinder for upward movement of the platform and to control the flow of such liquid from the cylinder to the low-pressure ports for downward movement of the platform; means utilizing the piston valve to move the vernier valve and such means and the valves being constructed and arranged so that, with the piston valve in lapping relation with respect to its cylinder port, the vernier valve may move from a position partially opening its cylinder port to one of its high-pressure and low-pressure ports to a position partially opening the first port to the other of the latter ports; an axially-movable valve shaft having the piston valve connected thereto to move therewith; transmission means connecting the motor means and the valve shaft and arranged to provide for axial movement of the latter relative to the former; a nut member restrained from axial movement and rotated by said movable component; said valve shaft including a screw portion engaging said nut member and the threads of the nut member and of the screw portion having such steep pitch that the screw portion may be moved axially through the nut member with forcible axial movement of the valve shaft independent of the nut member and of the motor means; means for stopping upward movement of the platform with the piston valve lapping its cylinder port and with the vernier valve partially uncovering its cylinder port to its high-pressure port and for stopping downward movement of the platform with the piston valve lapping its cylinder port and with the vernier valve partially uncovering its cylinder port to its low-pressure port; said stopping means including follower mechanism connected to move with the valve shaft when the latter moves axially and cams moved by the movable component for operating the follower mechanism; means for interrupting the supply of electric energy to the motor means as each platform movement is terminated; said transmission means for connecting the motor means to the valve shaft comprising motor driven mechanism and a coupling, the motor driven mechanism including a long pinion and a gear meshing therewith and the coupling serving to transmit motion from the gear to the valve shaft; a brake for said motor driven mechanism; means responsive to energization of the motor means to release the brake and to deenergization thereof to apply the brake; and manually-operable means for releasing the brake, for interrupting the electric energy supply to the motor means, and for rotating said motor driven mechanism; said coupling including means for absorbing shocks between the valve shaft and the gear and providing for rotary movement of the valve shaft relative to the gear when the brake is applied and the valve shaft is moved axially.

34. In a control system for a hydraulically-operated elevator having a movable component including a platform operatively connected to a plunger arranged in a cylinder, reversible electric motor means; piston and vernier valves cooperating with cylinder, high-pressure and low-pressure ports to control the flow of motive liquid from the high-pressure ports to the cylinder for upward movement of the platform and to control the flow of such liquid out of the cylinder to the low-pressure ports for downward movement of the platform; mechanism mechanically connecting the piston and vernier valves to provide a greater range of movement of the vernier valve than of the piston valve so that, with the piston valve moving in lapping relation with respect to its cylinder port, the vernier valve may move from a position partially opening its cylinder port to one of its high-pressure and low-pressure ports to a position partially opening the first port to the other of the latter ports; an axially-movable valve shaft having the piston valve connected thereto to move therewith; transmission means connecting the motor means and the valve shaft and arranged to provide for axial movement of the latter relative to the former; a nut member restrained from axial movement and rotated by said movable component; said valve shaft including a screw portion engaging said nut member and the threads of the nut member and of the screw portion having such steep pitch that the screw portion may be moved through the nut member with forcible axial movement of the valve shaft independent of the nut member and of the motor means; and means for stopping the platform at predetermined positions with the piston valve lapping its cylinder port and with the vernier valve nearly closing opening of the cylinder port to its high-pressure port when upward movement of the platform is stopped and nearly closing opening of the cylinder port to its low-pressure port when downward movement of the platform is stopped and means including a pair of cams connected to and movable with the plunger and a T-lever whose stem is operatively connected to the valve shaft and whose head portion has its ends formed for engagement by the cams.

35. In a control system for a hydraulically-operated elevator having a movable component including a platform operatively connected to a plunger arranged in a cylinder, reversible electric motor means; balanced piston and vernier valves arranged in valve chambers provided with cylinder, high-pressure and low-pressure ports with which the valves cooperate to control the flow of motive liquid from a high-pressure space and through the high-pressure ports into the cylinder for upward travel of the platform and to control the flow of such liquid out of the cylinder and through the low-pressure ports to a low-pressure space for downward travel of the platform; means utilizing the piston valve to move the vernier valve and such means and the valves being constructed and arranged so that, with the piston valve moving in lapping relation with respect to its cylinder port, the vernier valve may move from a position partially opening its cylinder port to one of its high-pressure and low-pressure ports to a position partially opening the first port to the other of the latter ports; an axially-movable valve shaft having the piston valve connected thereto to move therewith; transmission means connecting the motor means and the valve shaft and arranged to provide for axial movement of the latter relative to the former; a nut member restrained from axial movement and rotated by said movable component; said valve shaft including a screw portion engaging said nut member and the threads of the nut member and of the screw portion having such steep pitch that the screw portion may be moved axially through the nut member with axial movement of the valve shaft independent of the nut member and of the motor means; said cylinder port for the piston valve having tapered ends so that, as such ends are uncovered by the piston valve, the flow area increases at an increasing rate in relation to piston valve travel to provide for acceleration of the movable component; means for stopping the platform in predetermined positions with the piston valve lapping its cylinder port and the vernier valve nearly closing opening of its cylinder port to its high-pressure port when upward movement of the platform is stopped and nearly closing opening of its cylinder port to its low-pressure port when downward movement of the platform is stopped and said means including follower mechanism connected to move with the valve shaft when the latter moves axially and cams operated by the movable component to actuate the follower mechanism as said predetermined positions are approached for moving the valve shaft axially to move the valves in a closing direction and in such manner that the piston valve covers a tapered cylinder port end so as to smoothly and rapidly decelerate the movable component; said piston valve having end piston faces cooperating with end portions of the piston valve chamber to provide expansible chambers; and an equalizing passage connecting the expansible chambers.

36. Apparatus as claimed in claim 35 with means for restricting the equalizing passage.

37. Apparatus as claimed in claim 35 with a bleeder passage connecting the equalizing passage to the low-pressure space.

38. In a control system for a hydraulically-operated elevator having a movable component including a platform operatively connected to a plunger arranged in a cylinder, reversible electric motor means; piston and vernier valves cooperating with cylinder, high-pressure and low-pressure ports to control the flow of motive liquid from the high-pressure ports to the cylinder for upward movements of the platform and to control the flow of such liquid from the cylinder to the low-pressure ports for downward movements of the platform; means utilizing the piston valve to move the vernier valve and such means and the valves being constructed and arranged so that, with the piston valve moving in lapping relation with respect to its cylinder port, the vernier valve may move from a position partially opening its cylinder port to one of its high-pressure and low-pressure ports to a position partially opening the first port to the other of the latter ports; means for interrupting the supply of electric energy to the motor means as the end of each platform movement is reached; an axially-movable valve shaft having the piston valve connected thereto to move therewith; transmission means connecting the motor means and the valve shaft and arranged to provide for axial movement of the latter relative to the former; a nut member restrained from axial movement and rotated by said movable component; said valve shaft including a screw portion engaging said nut member and the threads of the nut member and of the screw portion having such steep pitch that the screw portion may be moved axially through the nut member with forcible axial movement of the valve shaft independent of the nut member and of the motor means; means for stopping upward movement of the platform with the piston valve lapping its cylinder port and with the vernier valve partially uncovering its cylinder port to the high-pressure port and for stopping downward movement of the platform with the piston valve lapping its cylinder port and the vernier valve partially uncovering its cylinder port to its low-pressure port and said means including follower mechanism movable with the valve shaft when the latter moves axially and cams moved by the movable component to actuate the follower mechanism for moving the valve shaft axially in order to move the valves in a closing direction incident to terminating platform movements; said transmission means for connecting the motor means to the valve shaft comprising motor driven mechanism and a coupling, the motor driven mechanism including a long pinion and a gear meshing therewith and the coupling serving to transmit motion from the gear to the valve shaft; a manual control shaft; gearing connecting the manual control shaft and the long pinion; a brake for the manual control shaft; brake control means responsive to energization and to deenergization of the motor means to apply and to release the brake; a switch for opening and closing the motor means electric supply circuit; a handle for operating the control shaft; means operative to connect the handle in driving relation with respect to the control shaft and to disconnect it from the latter; a member movable to render the handle accessible and inaccessible; and mechanism responsive to movement of the member to afford access to the handle to operate the handle-connecting means to connect the handle to the control shaft, to open the switch, and to operate the brake control means to release the brake and responsive to movement of the member to render the handle inaccessible, to disconnect the handle from the control shaft, to close the switch, and to operate the brake control means to apply the brake; said coupling between the gear and the valve shaft including means for absorbing shocks between such gear and the valve shaft and providing for rotary movement of the valve shaft relative to the gear when the brake is applied and the valve shaft is moved axially.

39. Apparatus according to claim 38 wherein the member which is moved to render the handle accessible and inaccessible is comprised by the hinged door of a casing enclosing the handle, the handle and control shaft connecting means, the brake and its control means, the switch, and the mechanism operated to open and close the switch and to operate the brake control means.

JAMES DUNLOP.